US012743492B2

(12) United States Patent
Nitsopoulos et al.

(10) Patent No.: US 12,743,492 B2
(45) Date of Patent: Sep. 22, 2026

(54) SYSTEMS AND METHODS FOR APPLICATION SECURITY IMPROVEMENTS

(71) Applicant: The PNC Financial Services Group, Inc., Pittsburgh, PA (US)

(72) Inventors: Michael Nitsopoulos, Pittsburgh, PA (US); Jerold Xing, Richmond Hill (CA)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 20 days.

(21) Appl. No.: 19/054,373

(22) Filed: Feb. 14, 2025

(65) Prior Publication Data

US 2026/0057041 A1 Feb. 26, 2026

Related U.S. Application Data

(60) Provisional application No. 63/685,047, filed on Aug. 20, 2024.

(51) Int. Cl.
*G06F 21/12* (2013.01)
*H04L 9/40* (2022.01)

(52) U.S. Cl.
CPC ........ *G06F 21/128* (2013.01); *H04L 63/0807* (2013.01); *H04L 63/123* (2013.01)

(58) Field of Classification Search
None
See application file for complete search history.

(56) References Cited

U.S. PATENT DOCUMENTS 11,606,359 B1 * 3/2023 Virtser .................. H04L 63/123
2021/0203542 A1 * 7/2021 Deshmukh ............. H04L 41/04

(Continued)

FOREIGN PATENT DOCUMENTS

CN 116484142 A * 7/2023 ........... G06F 16/958
CN 118802200 A * 10/2024 ............. H04L 67/02

OTHER PUBLICATIONS

Rawdat, Amir, "Announcing NGINX Ingress Controller Release 1.9.0", NGINX Community Blog post, Oct. 20, 2020, 15 pages. (Year: 2020).*

(Continued)

*Primary Examiner* — Michael Pyzocha
(74) *Attorney, Agent, or Firm* — Finnegan, Henderson, Farabow, Garrett & Dunner, LLP

(57) ABSTRACT

Systems and methods for application security improvements are provided. The systems and methods may receive a banking request, including a request header, from a web browser or mobile application. Thereafter, a session cookie may be extracted from the request header. The session cookie may include one or more of a CSRF token, a MORF token, and a JWT. Thereafter, an outer API may validate the one or more tokens and create a validated banking request object. Upon such validations, a financial institution's APIs may allow a banking request to proceed with a high degree of confidence that the request is free of interference by bad actors and fraud. The validated banking request object may be transmitted to an inner API to accomplish the banking request. Thus, the system and methods described herein provide an improved system for application security, which decreases rates of fraud below that of known systems.

20 Claims, 17 Drawing Sheets

(56) References Cited

U.S. PATENT DOCUMENTS

| | | | | |
|---|---|---|---|---|
| 2022/0191193 | A1* | 6/2022 | Hamilton | H04L 63/029 |
| 2022/0294861 | A1* | 9/2022 | Wittmann | H04L 65/1023 |
| 2022/0350642 | A1* | 11/2022 | Poddar | G06F 8/60 |
| 2024/0250817 | A1* | 7/2024 | Aswani | H04L 9/3213 |
| 2024/0291866 | A1* | 8/2024 | Kaveri Poompatnam Chandrasekaran | H04L 67/10 |
| 2025/0133074 | A1* | 4/2025 | Liu | H04L 63/062 |
| 2025/0300969 | A1* | 9/2025 | Bailey | H04L 63/126 |

OTHER PUBLICATIONS

Rawdat, Amir, "Easy and Robust Single Sign-On with OpenID Connect and NGINX Ingress Controller", NGINX Community Blog post,Feb. 1, 2021, 10 pages. (Year: 2021).*

Rawdat, Amir, "Managing Kubernetes Traffic with F5 NGINX", F5 e-book, Aug. 2022, 126 pages. (Year: 2022).*

NGINX, "Kubernetes Ingress Controller Deployment and Security with NGINX", F5 e-book, 2023, 186 pages. (Year: 2023).*

Rawdat, Amir, "Migrating from the Community Ingress Controller to F5 NGINX Ingress Controller", F5 blog post, May 19, 2022, 9 pages. (Year: 2022).*

Marius, "Attribute Based Access Control with OIDC and NGINX Ingress Controller in Kubernetes", Medium blog post, Jul. 19, 2020, 10 pages. (Year: 2020).*

* cited by examiner

SYSTEMS AND METHODS FOR APPLICATION SECURITY IMPROVEMENTS

PRIORITY CLAIM

This application claims the benefit of priority to U.S. Provisional Application Ser. No. 63/685,047, filed on Aug. 20, 2024, the contents of which are incorporated herein by reference in their entirety.

BACKGROUND

The present disclosure relates generally to systems and methods for application security improvements. More specifically, the present disclosure relates to the protection of application program interfaces (APIs) that support web-based applications such as banking applications and mobile banking applications. The present disclosure further relates to protecting and verifying a micro application outer request forgery token (MORF token), a JavaScript Object Notation (JSON) web token (JWT), and a cross site request forgery token (CSRF token).

A financial institution may have thousands of web-based requests and mobile banking requests at a given time. Application security includes verifying those requests to prevent bad actors from mimicking web-based and mobile banking application requests and subsequently accessing banking APIs.

Effective application security prevents loss on the part of both the customer and the financial institution. Further, improved application security may increase the profitability of a financial institution. For example, decreased rates of fraud may increase the customer base of a financial institution, thereby increasing profitability. Alternatively, it may be profitable to decrease the instances of fraud for which a financial institution is responsible.

Current application security systems tend to rely on a single gateway module, which tends to be a single point of failure for the entire system; if the single gateway module has a failure, then all APIs are hampered. Application security systems that only retrieve and validate JWTs or CSRF tokens from web-based or mobile requests fail to provide the security necessary for web-based and mobile banking applications. Additionally, application security systems that rely on a session token that remains valid throughout the user session may be vulnerable to replay attacks. This is because the server will only perform a full authorization at the start of the user session, after which the session token could be an active key to accessing the user's banking portal.

An improved application security system may, according to some embodiments of the present disclosure, issue one or more new session tokens, such as a new MORF token, for each request, thereby forcing the system to validate the user for every request, rather than for just the first request.

SUMMARY

Systems and methods for application security improvements are provided. The systems and methods may include receiving a request including a request header, from a web browser or mobile application.

A system for securely receiving a request is provided in accordance with some embodiments. In such embodiments, a reverse proxy may be configured to: receive a request, wherein the request includes a request header, wherein the request header includes at least one session cookie, wherein the at least one session cookie includes a session identifier (ID) and at least one token, wherein the at least one token is selected from at least one of a JSON web request token, a cross site request forgery request (CSRF) request token, or a micro application outer request forgery (MORF) request token; and route the request to a pod based on a set of predefined rules, wherein the pod includes a validator and a vertical slice. A validator may be referred to as a token validator. In some embodiments, a validator may be configured to: extract the at least one session cookie from the request header; extract the at least one token from the at least one session cookie; locate at least one session object stored in a session cache, based on the session ID; extract at least one token from the at least one session object, wherein the at least one token extracted from the at least one session object is the same type of the at least one token extracted from the at least one session cookie; compare the at least one token extracted from the at least one session cookie with the at least one token extracted from the at least one session object; convert the request into a validated request upon determining the at least one token extracted from the at least one session cookie matches the at least one token extracted from the at least one session object; and allow the validated request to enter the vertical slice for processing, wherein the vertical slice includes at least one of a micro application, an outer API, an inner API, or a system of record.

In some embodiments, a reverse proxy may be configured to: receive a request, wherein the request includes a request header, wherein the request header includes at least one session cookie, wherein the at least one session cookie includes a session ID and at least one token, wherein the at least one token is selected from at least one of a JSON web request token, a CSRF request token, or a MORF request token; and route the request to a first pod based on a set of predefined rules, wherein the first pod includes a proxy sidecar and a vertical slice. In some embodiments, a proxy sidecar may be configured to: extract the at least one session cookie from the request header; determine whether the first pod is configured to accept the request based on the set of predefined rules; upon determining that the first pod is configured to accept the request: locate at least one session object stored in a session cache, based on the session ID from the at least one session cookie; extract at least one token from the at least one session object, wherein the at least one token extracted from the at least one session object is the same type of the at least one token extracted from the at least one session cookie; compare the at least one token extracted from the at least one session cookie with the at least one token extracted from the at least one session object; convert the request into a validated request upon determining the at least one token extracted from the at least one session cookie matches the at least one token extracted from the at least one session object; and allow the validated request to enter the vertical slice for processing, wherein the vertical slice includes at least one of a micro application, an outer API, an inner API, or a system of record.

In some embodiments, a system for ensuring a request is received by the proper outer API is provided. In such embodiments, a micro application may be configured to: transmit a request, wherein the request includes a request header; an interceptor configured to: intercept the request; obtain a request MORF token from a micro application static property store; place the request MORF token in the request header of the request; and send the request to an outer API. In such embodiments, a validator may be configured to: intercept the request; extract the request MORF token from the request header of the request; extract a configuration MORF token from an outer API static property store;

compare the request MORF token with the configuration MORF token; convert the request to a validated request upon determining that the request MORF token matches the configuration MORF token; and transmit the validated request to the outer API. In such embodiments, the outer API may be configured to: route the validated request to an inner API based on a set of predefined rules. In such embodiments, the inner API may be configured to: route the validated request to a system of record based on a second set of predefined rules. In such embodiments, the system of record may be configured to: convert the validated request to an HTTP response by completing an action requested by the validated request; and transmit the HTTP response to the inner API. In such embodiments, the inner API may be further configured to: send the HTTP response to the outer API. In such embodiments, the validator may be further configured to: intercept the HTTP response, wherein the HTTP response includes a response header; generate a session MORF token; save the session MORF token in a session cache; place the session MORF token in the response header; and send the HTTP response to the micro application. In such embodiments, the interceptor may be further configured to: intercept the HTTP response; extract the session MORF token from the response header; save the session MORF token in a cookie store; and send the HTTP response to the micro application.

In some embodiments, a system for securely maintaining a user session may include an outer API configured to: receive a request from a micro application; generate a MORF token, a CSRF token, and a JSON web session token (JWT); sign the JWT using a private key; store the JWT, the MORF token, and the CSRF token, in a session cache; and transmit a copy of the MORF token, a copy of the CSRF token, and the JWT with a public key to the micro application. In such embodiments, the micro application may be configured to: store the copy of the MORF token, the copy of the CSRF token, and the JWT with the public key in at least one session cookie, wherein the at least one session cookie is stored in a cookie store; and transmit a second request to the outer API, wherein the second request includes a request header containing the copy of the MORF token, the copy of the CSRF token, and the JWT with the public key. In such embodiments, a MORF, CSRF, and JWT validator may be configured to: intercept the second request; extract the request header from the second request; extract the MORF token, the copy of the CSRF token, and the JWT from the request header; extract the JWT, the MORF token, and the CSRF token from the session cache; compare the copy of the MORF token, the copy of the CSRF token, and the JWT extracted from the request header with the JWT, the MORF token, and the CSRF token from the session cache; convert the second request to a validated second request upon determining that the copy of the MORF token, the copy of the CSRF token, and the JWT extracted from the request header matches the JWT, the MORF token, and the CSRF token from the session cache; and transmit the validated second request to an inner API. In such embodiments, the inner API may be configured to: transmit the validated second request to a system of record. In such embodiments, the system of record may be configured to: respond to the second request.

In some embodiments, one or more devices that are configured or operable to perform the above-described systems and methods are disclosed.

The above and other aspects and their implementations are described in greater detail in the drawings, the descriptions, and the claims.

DETAILED DESCRIPTION

Reference will now be made in detail to exemplary embodiments, discussed with reference to the accompanying drawings. Unless otherwise stated, technical and/or scientific terms have the meaning commonly understood by one of ordinary skill in the art. It is to be understood that other embodiments may be implemented and that changes may be made without departing from the scope of the disclosed embodiments. For example, unless otherwise indicated, method steps disclosed in the figures may be rearranged, combined, or divided without departing from the envisioned embodiments. Phrases that tend to indicate an order of events, such as "before," "prior to," then," "after," and the like are not intended to be limiting. Similarly, additional steps may be added, or steps may be removed, without departing from the envisioned embodiments. Thus, the materials, methods, and examples are illustrative only and are not intended to be necessarily limited.

Figure 1:
FIG. 1 is a schematic diagram of members of an institution expressing their desire to improve application security, consistent with some disclosed embodiments.

FIG. 1 is a schematic diagram of members of an institution expressing their desire to improve application security, consistent with some disclosed embodiments. Corporate directors 108 may express a desire 109 to improve application security for their online banking systems and prevent replay attacks, consistent with disclosed embodiments.

A replay attack may be a type of network attack in which an attacker intercepts and captures a valid data transmission (such as an authentication token, login request, or banking transaction) and then maliciously retransmits it to trick the server into performing an unauthorized action or obtaining the user's banking information. For example, if the attacker captures a valid session token or a valid session ID, the attacker can submit requests to the server while pretending to be the authorized user. Replay attacks can be particularly dangerous in scenarios where authentication or authorization information is transmitted over a network.

Current application security systems tend to rely on a single gateway module, which may be a single point of failure for the entire system; if the single gateway has a failure, then all APIs may be hampered. Application security systems that only retrieve and validate JWTs or CSRF tokens from web-based or mobile requests fail to provide the security necessary for web-based and mobile banking applications. Additionally, application security systems that rely on a session token that remains valid throughout the user session may be vulnerable to replay attacks. This may be because the server will only perform a full authorization at the start of the user session, after which, the session token could be an active key to accessing the user's banking portal. Therefore, there is a need for a system that solves these problems by maintaining a system even if there is a point of failure and by performing authorization multiple times to ensure a user session is not intercepted by a malicious actor.

Figure 2:
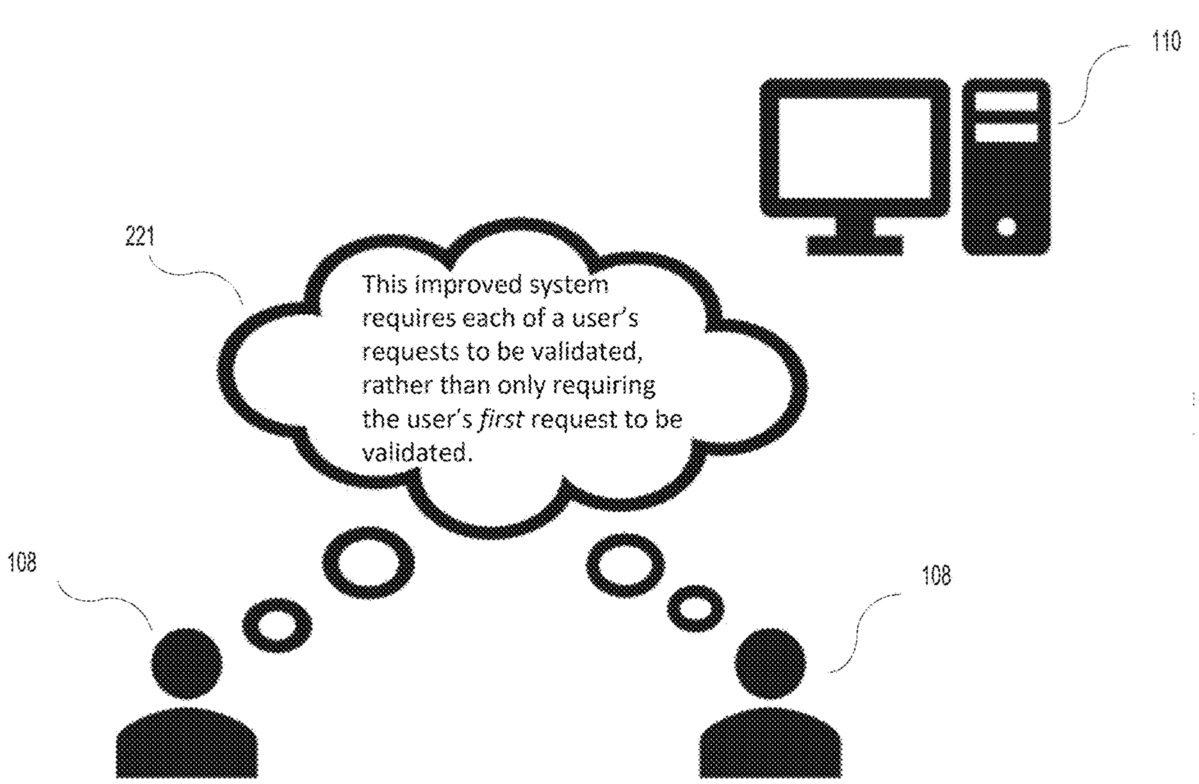
FIG. 2 is a schematic diagram of members of an institution describing a system for improving application security, consistent with some disclosed embodiments.

FIG. 2 is a schematic diagram of members of an institution describing a system for improving application security, consistent with some disclosed embodiments. In some embodiments, a solution 221 may be associated with a system for application security improvements 110 for improving application security for online banking systems and preventing replay attacks. An improved application security system, according to some embodiments, issue one or more new session token, such as a new MORF token, for each request, thereby requiring the system to validate the user for every request, rather than for just the first request. This can be an effective method of mitigating replay attacks because the server issues new tokens with each response instead of validating a request with a previously used token. Thus, even if an attacker captures the first session token, the attacker cannot submit a fraudulent second request with the first session token.

Figure 3:
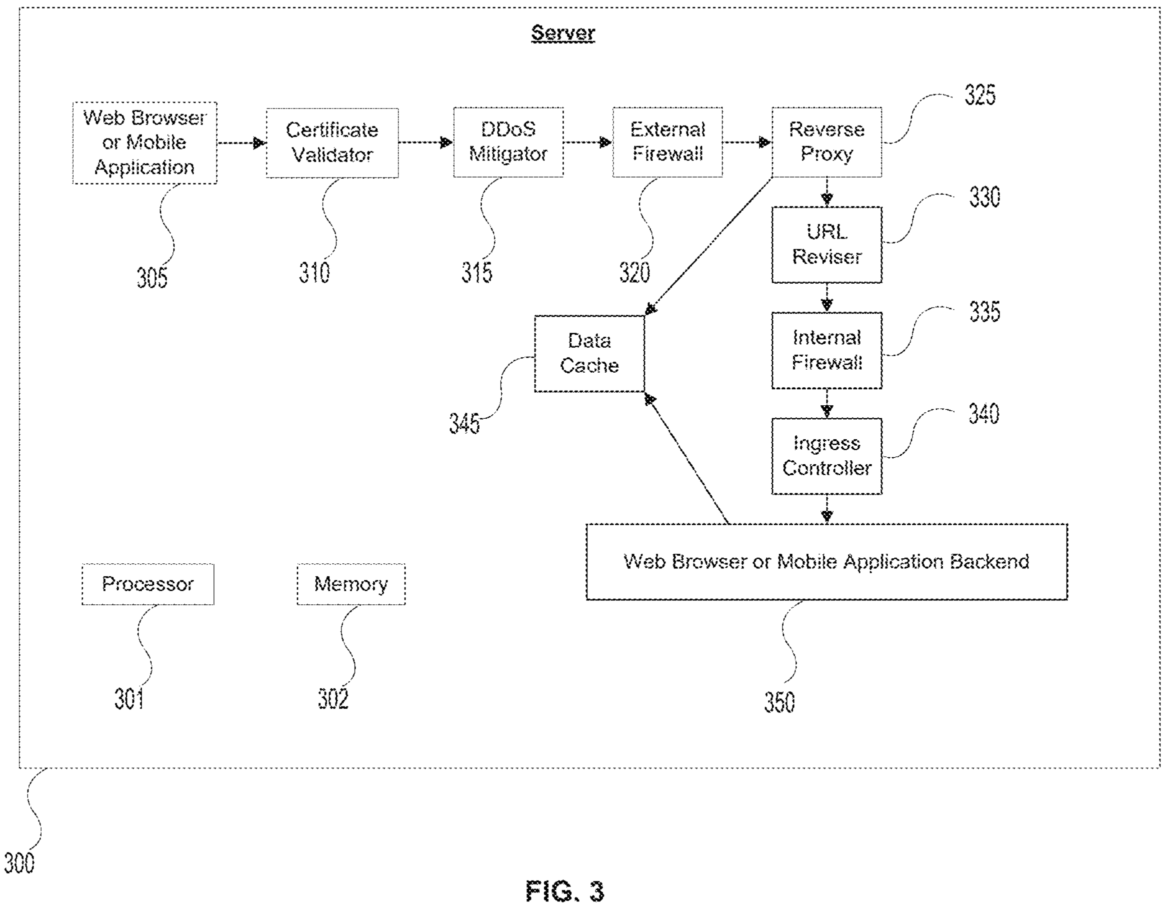
FIG. 3 is a diagram of various security modules that may be implemented before introducing a request to the web browser or mobile application backend, consistent with disclosed embodiments.

FIG. 3 shows a system of securely introducing a request to the web browser or mobile application backend, consistent with some disclosed embodiments. The system may utilize one or more servers 300, which may include one or more processors 301, and one or more memories 302.

Server 300 may include any form of remote computing device configured to receive, store, and transmit data. For example, server 300 may be a server configured to store files accessible through a network (e.g., a web server, application server, virtualized server, etc.). Server 300 may be implemented as a software as a service (Saas) platform through which software for auditing recorded user activity may be provided to an organization as a web-based service.

Processor 301 may include any physical device or group of devices having circuitry configured to perform one or more logic operations on an input or inputs. For example, processor 301 may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. Processor 301 may take the form of, but is not limited to, a microprocessor, embedded processor, or the like, or may be integrated in a system on a chip (SoC). Furthermore, according to some embodiments, processor 301 may include one or more of the family of processors manufactured by Intel®, AMD®, Qualcomm®, Apple®, NVIDIA®, or the like. The processor 301 may also be based on the ARM architecture, a mobile processor, or a graphics processing unit, etc. The disclosed embodiments are not limited to any type of processor configured in server 300.

Memory 302 may include one or more storage devices configured to store instructions used by the processor 301 to perform functions related to server 300. The disclosed embodiments are not limited to particular software programs or devices configured to perform dedicated tasks. For example, the memory 302 may store a single program, such as a user-level application, that performs the functions associated with the disclosed embodiments, or may comprise multiple software programs. Additionally, the processor 301 may, in some embodiments, execute one or more programs (or portions thereof) remotely located from server 300. Furthermore, memory 302 may include one or more storage devices configured to store data for use by the programs. Memory 302 may include, but is not limited to a random access memory (RAM), a read-only memory (ROM), a hard drive, a solid state drive, an optical disk, other permanent, fixed, or volatile memory, a CD-ROM drive, a peripheral storage device (e.g., an external hard drive, a USB drive, etc.), a network drive, a cloud storage device, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, or by any other way that permits them to interact with each other.

In operation, a request may be submitted by a client to a web browser or mobile application 305. The web browser or mobile application 305 may encompass micro applications for various tasks, such as the login micro application and account summary micro application described in the detailed description of FIG. 7. For example, a login micro application may be in part responsible for facilitating a client logging into their mobile or online banking portal. For example, an account summary micro application may be in part responsible for facilitating access to or modifications to a client's mobile or online banking account. The request submitted by the client may be referred to as a client request. The request received by a web browser or mobile application 305 may be a hypertext transfer protocol (HTTP) request. For example, the request may be a login request, wherein the user may provide her banking login information and request access to her bank account. Or, for example, the request could be a transfer request, wherein the user is requesting to transfer some money from one bank account to a second bank account. "The request," as used in subsequent descriptions, may be an HTTP, file transfer protocol (FTP), WebSocket, or other type of request. The request may be submitted by the client, which may be a web browser, a mobile application, or a micro application.

A web browser may be a software application that enables users to access, navigate, and interact with content on the internet. The web browser may interpret and display web pages, multimedia, and interactive elements by processing web technologies like hypertext markup language (HTML), cascading style sheets (CSS), and JavaScript. A mobile application may be a software program designed to run on mobile devices and may include mobile banking applications. A micro application may be a small, self-contained software program designed to perform a specific task or set of tasks. For example, there may be a login micro application whose sole task is to facilitate a user logging into their bank account.

The web browser or mobile application 305 may receive the client request and convert it to an application request. The application request may include a request header, which may provide metadata and context about the request being made by the client to the server. A request header may also include, but is not limited to, the type of request being sent, how the data should be handled, and details about the client making the request.

A request header may also contain one or more session cookies. In some embodiments, a session cookie may be a type of cookie that temporarily stores information about a user's session on a web application. A session cookie may be automatically deleted after a specified duration or when the browser or application is closed. One or more tokens may be saved in each session cookie.

The session cookie may include a token such as a JWT, CSRF token, or a MORF token, and a session ID generated by the system and sent to the browser. The one or more tokens may be generated by an identity and access manager or a pod, as further explained in the detailed description of FIGS. 4-17. In some embodiments, where more than one type of token is used, a first token may be generated by the identity and access manager, and a second token may be generated by a pod. In some embodiments, the one or more tokens may be regenerated based on a set schedule or according to certain rules, for example, based on the passage of time, or the occurrence of an event.

A session ID may be a unique identifier generated by a server to track a user's interactions and activities during a specific session on a website or application.

A session cookie may also contain other information relevant to the session. The session cookie may be stored by the user's browser and allow the system to identify the particular session and manage user-specific data. User-specific data may include a username, an account number, a pin, a password, a phone number, an email address, vocal match data, iris match data, fingerprint match data, or facial identification data. In some embodiments the web browser or mobile application may store the session cookie and send it back to the server with each subsequent request to allow the server to identify the particular session and manage user-specific data.

The token, such as a JWT, CSRF token, or MORF token, may include unique and encrypted strings. A JWT or CSRF token may be used to identify the user as a legitimate user of the website or application. A CSRF token may protect an application from phishing and prohibit rogue scripts in email or malicious websites from accessing content in other web browser tabs.

A MORF token may be used to ensure that the request is being transmitted to the proper area of the system to handle the requested user interface (UI) or user experience (UX).

UX may be the overall experience a user has when interacting with a product or service, including user interface, ease of use, accessibility, and efficiency. UI may be the point of interaction between the user and the product, including visual elements and interactive components of a product, such as buttons, menus, icons, typography, and layout.

A particular requested UI may be handled by one type of outer API and one type of inner API. Therefore, the MORF token may ensure that the request is being sent to and handled by the proper outer API and inner API. This ensures consistency and accuracy in fulfilling the user's request. An API may act as a conduit between the user and the server that has a set of rules for how information is exchanged between the two.

For example, the MORF token may ensure that a user's request to log in to their bank account application is being sent to and processed by the outer API and inner API that can best handle requests to log in to bank accounts, rather than those that handle, for example, customer service requests.

MORF tokens may also prevent unauthorized access between micro applications and outer APIs. Micro application and outer APIs may collaborate to generate and exchange MORF tokens during request/response cycles. In some embodiments, the one or more tokens may be validated in multiple locations to ensure redundant security checks and to ensure the integrity of requests and responses, preventing unauthorized access attempts. For example, the one or more tokens may be validated by the reverse proxy and again in a pod.

A JWT may be a type of token used to securely transmit information between parties. A JWT may be small enough to easily send over the internet, which makes it efficient for web applications. A JWT may also be universal resource locator (URL)-safe, meaning that the JWT can be included in the URL of a web browser. The JWT may contain information about the user including, for example the user's username, an account number, a pin, a password, a phone number, an email address, vocal match data, iris match data, fingerprint match data, or facial identification data.

The request may be prompted for certificates, such as those within a JWT, CSRF token, or a MORF token, by a certificate validator 310. A certificate validator may insert certificate fields into a request header of the request, as described herein. Further, a certificate validator may operate as a web application firewall. In some embodiments, a web application firewall may block requests from predetermined geographies as well as cyber attacks, such as cross-site scripting or structured query language (SQL) injection. In some embodiments, the certificate validator 310 may also perform caching, where copies of frequently requested resources are saved in memory to serve them quickly without needing to contact the backend servers each time. Thus, caching can reduce latency and decrease load on servers.

Cross-site scripting may be a type of security vulnerability that allows an attacker to inject malicious scripts into web pages viewed by other users. SQL injection may be a type of security vulnerability that allows an attacker to manipulate the SQL queries that a web application sends to its database. SQL injections may result in unauthorized access to or manipulation of the database The request may also be screened for distributed denial-of-service (DDOS) attacks by a DDOS mitigator 315. A DDOS attack may be a type of cyberattack where multiple systems are used to flood a target system, such as a server, network, or website, with an overwhelming amount of traffic or requests. One goal of a DDOS attack may be to disrupt the normal functioning of the target of the cyberattack, making it unavailable to its intended users. In some embodiments, the DDOS mitigator 315 may also perform caching, where copies of frequently requested resources are saved in memory to serve them quickly without needing to contact the backend servers each time. Thus, caching can reduce latency and decrease load on servers. DDOS mitigation may be performed by an internet service provider. DDS mitigation may work by monitoring incoming traffic, detecting potential attacks based on traffic patterns and anomalies, filtering or scrubbing malicious traffic, rate-limiting excessive requests, and diverting traffic when needed. DDOS mitigation may help ensure that legitimate user traffic can continue to reach the targeted system even during an active DDOS attack.

Further, the request may be screened by external firewall 320. An external firewall may monitor and control incoming and outgoing network traffic based on predefined security rules and act as a barrier between an internal network and external networks, such as the internet. An external firewall may act as a site shield by only allowing traffic from a certificate validator or by controlling incoming or outgoing traffic to mitigate server overload.

After routing through the external firewall 320, the request may be sent to a reverse proxy 325. Reverse proxy 325 may act as the single entry into the web or mobile online banking application and sits in front of the container platform. Reverse proxy 325 may check whether each request has proper authentication and a valid authentication token, and if not, it may redirect the request to an authentication screen.

Proper authentication may refer to the process by which the reverse proxy ensures that the user or entity making the request has successfully proven their identity according to the security requirements of the system. This typically involves verifying credentials such as a username and password, or other forms of identity verification like multi-factor authentication.

An authentication token may include one or more of a JWT, CSRF token, or a MORF token. The reverse proxy may ensure that the one or more tokens are unexpired, untampered with, and/or recognized by the system as legitimate to grant access to the requested resource. In some embodiments, the reverse proxy may perform a subset of the steps involved in validation of the one or more tokens, and in other embodiments, the reverse proxy may perform a full validation of the one or more tokens. The process of validation is explained further in the detailed descriptions of FIGS. 4-17.

Reverse proxy 325 may also perform tasks such as traffic management (distributing client requests across multiple servers to ensure that no single server becomes overwhelmed and that the request is delivered to the appropriate server based on factors such as the request type) and authentication. Reverse proxy 325 may communicate with a data cache 345. For example, during the process of token validation, reverse proxy 325 may save and retrieve information from the data cache 345. The data cache 345 may allow for temporary storage of information in memory for faster and more streamlined access in the future. Accessing information from temporary memory or random access memory can be faster than from long term disk storage, allowing for enhanced performance of certain functions requiring retrieval of frequently accessed data. In some embodiments, the data cache 345 is RAM, which may allow for fast access. In some embodiments, data cache 345 may encompass a session cache, for example, as described in the detailed descriptions of FIGS. 4-17.

After passing through the reverse proxy 325, the request may be routed to the URL reviser 330 to revise the request header. URL reviser 330 may be a system or component that modifies URLs in a way that may enhance usability, security, search engine optimization, or other tasks. There could be many reasons that a proxy server may rewrite an URL using URL reviser 330. For example, for load balancing to send the requests to specific servers to handle the incoming traffic, to translate protocol such as between HTTP to hypertext transfer protocol secure (HTTPS), or to redirect the traffic for access control. In some embodiments, the URL revisor 330 may edit the URL to improve user readability, for example, changing "example.com/index.php?page=products=123" to "example.com/products/123".

The request may also be screened by an internal firewall 335. In contrast to the external firewall 320, which may be positioned at the perimeter of a web browser or mobile application backend 350 to control incoming and outgoing network traffic, internal firewall 335 may be positioned within the web browser or mobile application backend 350 to protect the internal server network. Internal firewall 335 may control and monitor traffic between segments or zones of the web browser or mobile application backend 350. Segments may refer to different parts or layers of a network or application architecture that are logically separated based on function, security level, or role. Zones may be broader regions or areas within an infrastructure that group similar segments or resources with the same security or access requirements.

This control within the web browser or mobile application backend 350 may include enforcing security policies between segments or zones. In part, this control can provide isolated security zones in the networks and mitigate security breaches from proliferating between segments or zones of the web browser or mobile application backend 350. Internal firewall 335 may block non-compliant requests, which may ensure that only requests mapped to an address managed by the appropriate network segment are allowed to get into that segment.

Ingress controller 340 may route requests between pods, may act as the single funnel into the container environment, and may be owned by the container environment. Ingress controller 340 may distribute and route incoming requests to the appropriate cluster, pod, segment, or zone of the web browser or mobile application backend 350 to handle the request based on certain routing rules, capacities and capabilities of each cluster, pod, segment, or zone. For example, the ingress controller 340 may route a request to open a new bank account to different segment of the web browser or mobile application backend 350 than it may route a request to view the balance of the user's existing bank account or a request to contact customer service.

The ingress controller 340 may need to first decrypt requests before determining the appropriate destination in the web browser or mobile application backend 350. The ingress controller 340 may also play a role in load balancing by ensuring an individual server is not overloaded by requests. Once the requests are routed to the appropriate segment of the web browser or mobile application backend 350, the relevant internal micro application may perform the desired action.

The web browser or mobile application backend 350 may include an external API and an internal API. The web browser or mobile application backend 350 may communicate with the data cache 345. For example, during the process of token validation, the web browser or mobile application backend 350 may retrieve information from the data cache 345. An external API may be exposed to external organizations including open banking APIs. These APIs may cater to third-party consumers. An internal API may be only accessible internally and handles user requests. An internal API may be subdivided into an outer API and an inner API.

An outer API may be an interface primarily utilized for an organization's own channel applications or exposed to third parties. Outer APIs may serve as the bridge between the user interface and the backend systems, sometimes referred to as a system of record (SOR).

The UI may be the part of a web browser or mobile application that the user interacts with. A micro UI may be the part of a micro application that the user interacts with. Outer APIs may orchestrate calls to inner APIs, filter and transform data to fit the channel experience and prepare data for consumption by the UI.

The outer API may be tightly coupled with the UI, which may be unique to each user experience. An outer API may control how, when, and how much a particular user can access information on the server and may create a set of rules or security features to prevent unauthorized users from accessing or modifying information on the server.

An inner API may be the APIs for backend systems or SORs. Inner APIs may act as the abstraction layer for SORs, ensuring loose coupling between micro applications and SORs. An abstraction layer may refer to a design concept used in software development that may simplify complex systems by hiding their underlying details and exposing only the necessary components or functionalities to the user or other systems. An abstraction layer may thus help manage complexity, improve modularity, and enhance code maintainability.

Inner APIs may be categorized into read APIs and write APIs. Read APIs may retrieve data, often integrating with a data streaming platform (DSP) for real-time data. Write APIs may perform data modification operations directly on SORs. A request may be transmitted between each of the components mentioned with reference to FIGS. 3-17 via a network connection or a local connection.

Figure 4:
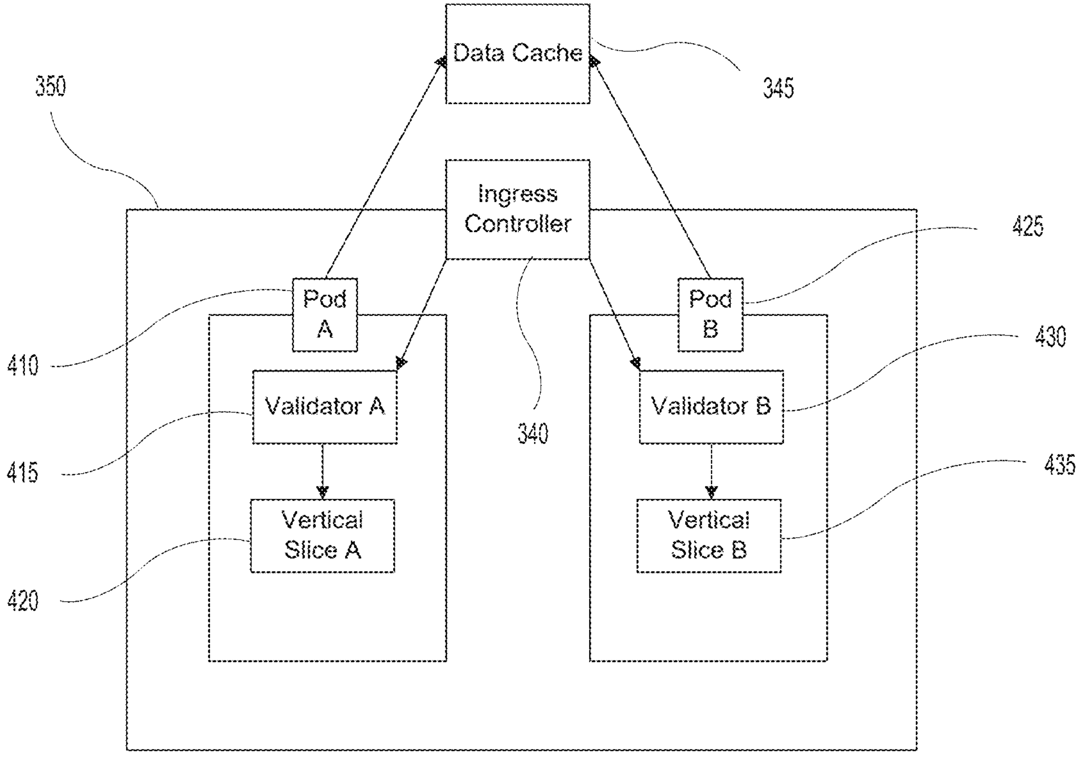
FIG. 4 is a schematic block diagram of a system capable of introducing a request to various pods using an ingress controller and validators, consistent with disclosed embodiments.

FIG. 4 is a schematic block diagram of a system capable of introducing a request to various pods using an ingress controller and validators, consistent with disclosed embodiments. FIG. 4 incorporates elements from FIG. 3. In some embodiments, ingress controller 340 may be configured to receive requests and route such requests to the appropriate pod within a cluster such as pod A 410 and pod B 425 in the web browser or mobile application backend 350.

As a nonlimiting example, the system described herein may allow for the deployment, scaling, and management of containerized applications or micro-applications. A pod may be the smallest deployable unit in the system and can contain one or more containers, all of which run together. Each container runs an application or service. For example, one pod may house independent containers that perform web hosting, monitoring, data processing, and authentication, respectively.

In the embodiment depicted in FIG. 4, pod A 410 and pod B 425 each include one container, which includes a validator and a vertical slice. However, either or each of pod A 410 and pod B 425 may include multiple containers and it is to be understood the configuration illustrated in FIG. 4 is merely exemplary.

The system described herein may contain a plurality, tens, hundreds, or thousands of pods. Some of those plurality of pods may be replicas of one another, allowing the backend to handle increased load and traffic, and to serve as redundancies in case of pod failure. Each pod may contain a micro application of an online banking or mobile banking application.

Each pod, such as pod A 410 and pod B 425 may contain a validator, such as validator A 415 and validator B 430, and a vertical slice, such as vertical slice A 420 and vertical slice B 435. In this example, after the request is validated, it routes to the vertical slice. A validator may intercept requests and in part, extract any tokens such as JWT, CSRF, or MORF tokens, to validate the request before allowing the request to pass into a vertical slice within the pod.

Validating a request may include one or more of the following steps. For example, validator A 415 may extract at least one session cookie from the request header of a request. If the request does not have a session cookie, the validator A 415 may deny the request, and the user may be prompted to log in again. If the request has a session cookie, validator A 415 may extract a JWT, CSRF, and/or MORF token and a session ID from the session cookie. Based on the session ID, validator A 415 may search the data cache 345 for a system object keyed to the session ID. A system object may be an entity that can store information such as tokens. A system object may be stored in the system cache. In some embodiments, a system object may also be referred to as a session object.

If validator A 415 finds the system object keyed to the session ID, validator A 415 may compare the token saved in the system object to the token extracted from the request. Validation of a request may also include ensuring the tokens are not expired, that the tokens contain the necessary permissions for the requested operation, and that the request's fields are completed and correctly formatted for the server to properly perform the requested action. After validation, the request may be referred to as a validated request or a validated request object.

A validator may also ensure that configurations, deployments, and resources adhere to specified rules and standards before the system takes action.

A vertical slice may contain several or all components of a micro application, allowing the vertical slice to run the entire micro application independently in a self-contained system. In some embodiments, the vertical slice, such as vertical slice A 420 and vertical slice B 435, includes a UI or micro UI, an outer API, an inner API, and a system of record. In some embodiments, there may be a 1:1:1 ratio of UI to outer API to inner API. This means that a particular inner API may be configured to work with a particular outer API, which is in turn, may be configured to work with a particular UI. For example, an outer API configured for customer service requests may not accept a micro UI's request to log in to a bank account. Thus, in some embodiments it may be important that the request is routed to the proper outer API, or the outer API that is configured to accept the given type of request.

One or more of the outer API, inner API, and system of record may also perform token validation as described above with reference to the validator.

One benefit of using vertical slice architecture may be that each micro application can run independently and the failure of one micro application has no impact on the operation and security of other micro applications. Examples of micro applications that can have their own vertical slices include but are not limited to viewing payment history, setting up a new payee, viewing future-dated payments, setting up a one-time payment, setting up a recurring payment, and viewing payments by a payee. Multiple pods may independently run the same type of vertical slice to provide redundancy and scalability for each type of vertical slice. For each vertical slice, a micro UI, an outer API, and an inner API may work together to provide the functionality required by that experience.

Each pod may be individually and automatically scaled and managed based on non-functional requirements. Non-functional requirements may define the performance, reliability, and constraints of each pod. A pod's performance may be defined in terms of response time, throughput, or resource utilization. The response time may be the time it takes for the pod to receive a request, process it, and send the response back to the client. A pod's reliability may be defined in terms of instances of downtime, pod failure, and data loss. A pod's constraints may be defined in terms of limits on traffic or certain types of requests to enable proper compliance with the system's security rules. Ingress controller 340 may route a request to a pod based on predefined rules including maximum traffic volume to the pod, availability of the pod, and required response time of the pod, such that the pod is one that has not reached its maximum traffic, is available, and has an adequate response time. A pod's response time may be considered adequate for a particular request based on, for example, the importance of the request, the client's willingness to wait for the request, or a minimum response time, such as under 1 second, under 500 milliseconds (ms), under 300 ms, under 200 ms, under 100 ms, or under 50 ms. The minimum response time may be based on the complexity of the request.

Non-functional requirements may set expectations for how a properly functioning pod should look, allowing the overall system to dynamically up-scale or down-scale the number of pods to ensure proper capacity. In this context, "capacity" may refer to the system's ability to handle a certain amount of workload, such as the number of user requests.

Figure 5:
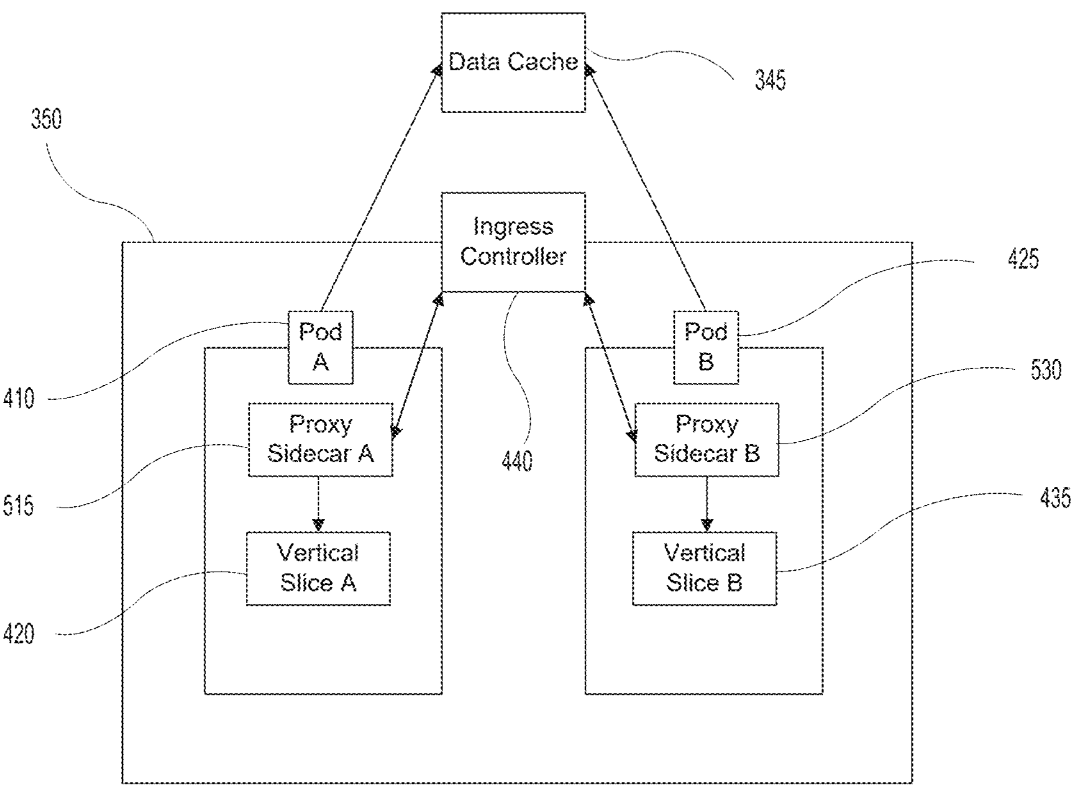
FIG. 5 is a schematic block diagram of a system capable of introducing a request to various pods using an ingress controller and proxy sidecars, consistent with disclosed embodiments.

FIG. 5 is a schematic block diagram of a system capable of introducing a request to various pods using an ingress controller and proxy sidecars, consistent with disclosed embodiments. FIG. 5 incorporates elements from FIGS. 3 and 4. In some embodiments, pod A 410 and pod B 425 may each contain a proxy sidecar such as proxy sidecar A 515 and proxy sidecar B 530 and a vertical slice such as vertical slice A 420 and vertical slice B 435. In this example, after the request is checked by the proxy sidecar, the request may be routed to the vertical slice.

In some embodiments, a proxy side car may act as a pre-processor to the vertical slice, performing cross cutting/common functionalities, such as enforcement of security rules, service discovery, load balancing, or data logging so the vertical slice can more efficiently handle the incoming user request.

Security rules may be policies and mechanisms that control and protect access to resources, ensuring that only authorized users or systems can interact with them. Service discovery may be a process by which services within a network or system automatically locate and communicate with each other without requiring manual configuration. Load balancing may be a method of distributing incoming traffic or workload across multiple servers to ensure optimal performance and reliability.

Additionally, proxy sidecar A 515 and proxy sidecar B 530 may communicate with one another, for example, to transfer a request to another proxy sidecar. For example, if proxy sidecar A wants to communicate with proxy sidecar B to send it a request that proxy sidecar A is unable to execute, proxy sidecar A 515 may communicate to the ingress controller between pod A 410 and pod B 425. Alternatively, ingress controller 440 may communicate the request to proxy sidecar B 530. Alternatively, proxy sidecar B 530 may verify that it is configured to handle the request. If proxy sidecar B 530 is configured to handle the request and such a request satisfies the relevant non-functional requirements, proxy sidecar B 530 may execute the request. If proxy sidecar B 530 is not configured to handle the request and such a request does not satisfy the relevant non-functional requirements, proxy sidecar B 530 may deny the request.

In some embodiments, the proxy sidecar may also perform the validation functions of a validator, as explained in the detailed description of FIG. 4. For example, the proxy sidecar may validate incoming requests before sending the request to the vertical slice. In some embodiments, a validator component is embedded in the proxy sidecar.

A service mesh may encrypt communication between proxy sidecars in different containers. In contrast, some containers may be isolated permanently or on-demand, for example, to prevent an attacker from being able to move laterally through the system and infect other pods or containers. A service mesh may control and manage lateral communication between pods. Service mesh management may include traffic management, encryption security, data logging, and policy enforcement.

For example, based on traffic routing rules, proxy sidecar B 530 may communicate confirmation to proxy sidecar A 515 that proxy sidecar B 530 is configured to accept requests from pod A 510. Proxy sidecar A 515 may then confirm that, based on the non-functional requirements of pod A 410 and pod B 425, proxy sidecar B 530 can indeed accept requests from pod A 410. These intra proxy sidecar communications may be routed through ingress controller 340. If confirmed, proxy sidecar A may initiate routing of requests from pod A 410 to pod B 425. If not confirmed, the request may be rejected. Upon rejecting the request, the pod or the proxy sidecar may notify the user of the error and prompt the user to retry the request or log in again.

Figure 6:
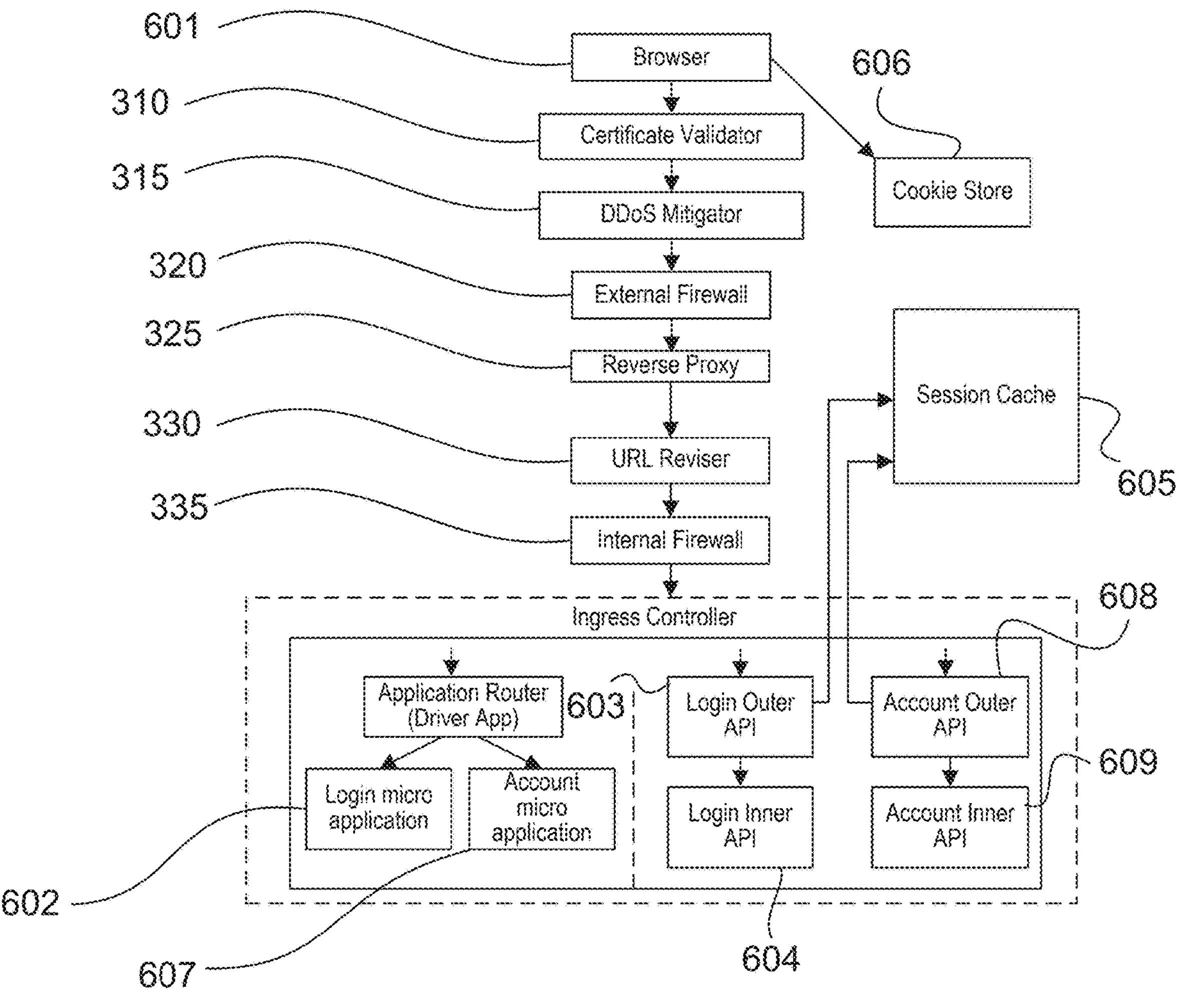
FIG. 6 is a schematic block diagram of a system capable of introducing a request to various API systems, consistent with disclosed embodiments.

FIG. 6 is a schematic block diagram of a system capable of introducing a request to various API systems, consistent with disclosed embodiments. FIG. 6 incorporates elements from FIG. 3. In operation, a user may try to access their account via a web browser 601, which may be a mobile application. This attempt to access the user's account may be a type of request. Each request from the user may follow one or more of the pre-processing steps detailed with reference to FIG. 3, wherein the request is processed by the certificate validator 310, the DDOS mitigator 315, the external firewall 320, reverse proxy 325, URL reviser 330, and/or internal firewall 335.

The web browser 601 may be redirected to a login page. In some embodiments, a login micro application 602 may be served and loaded in the browser 601. A micro application may be a small, self-contained application or component that performs a specific function or service within a larger ecosystem of applications. In this embodiment, the login micro application 602 may be designed to facilitate a user logging into their bank account via a web browser or mobile application.

The client may make a login API call via the login micro application 602. An API call may be a request made by a client to an API to perform a specific operation or retrieve data.

In some embodiments, the login API call may request a login outer API 603 to obtain information that is only accessible to the user after logging in to their bank account.

In some embodiments, a login inner API 604 may be invoked by the login API call. The login inner API 604 may request a JWT from an identity and access manager. The identity and access manager may issue a JWT, and the JWT may be provided to the login outer API. In some embodiments, the login outer API may store the JWT into a session cache 605, keyed by a session ID. In some embodiments, the session cache 605 may be a Redis cache, wherein the session cache is saved in RAM, making it more quickly accessible than if the session cache were saved on a traditional disk-based storage.

Saving the JWT in the session cache 605 may be beneficial because the outer API or a validator may validate the JWT without leaving the internal system.

The JWT and session ID may also be returned to the user's browser as a secure cookie. In some embodiments, the browser 601 may store the JWT and session ID as a cookie in the cookie store 606. Next, the browser 601 may request the account micro application. In some embodiments, the account micro application 607 may be served and loaded in the browser 601. The account micro application 607 within the browser 601 may make an account API call with the JWT and the unique session ID in the request header. An account API may be an API that handles access to the user's bank account.

In some embodiments, the account outer API 608 may receive the account API call. In some embodiments, the account outer API 608 may use the session ID in the request header of the account API call to retrieve the JWT from the session cache 605. In some embodiments, the account inner API 609 may also use the session ID to retrieve the JWT from the session cache 605. The account outer API 608 and the account inner API 609 may both benefit from using the session ID to retrieve the JWT from the session cache 605 so the JWT is verified in both stages, enforcing a zero-trust policy. In some embodiments, the outer API or inner API may use a validator to communicate with the session cache 605 and/or to validate the JWT.

An identity and access manager may then retrieve a locally stored certificate and validate the JWT submitted in the browser's request header. The identity and access manager is further explained in the detailed description of FIG. 7. After validation, the request may pass to the SOR, also referred to as the system backend, server, or web browser or mobile application backend.

The SOR may also validate the JWT in the same or similar manner as the account outer API 608 and the account inner API 609 to further enforce a zero-trust policy. The SOR may use a validator to validate the JWT. Next, the SOR may fulfill the request. When sending the SOR's response back to the browser 601, the identity and access manager, account outer API 608, or account inner API 609 may generate a new JWT for use with the browser's 601 next request. In other embodiments, one or a combination of CSRF and/or MORF tokens may be used instead of or in addition to JWT. The process for MORF tokens is explained in the detailed description of FIG. 17.

Figure 7:
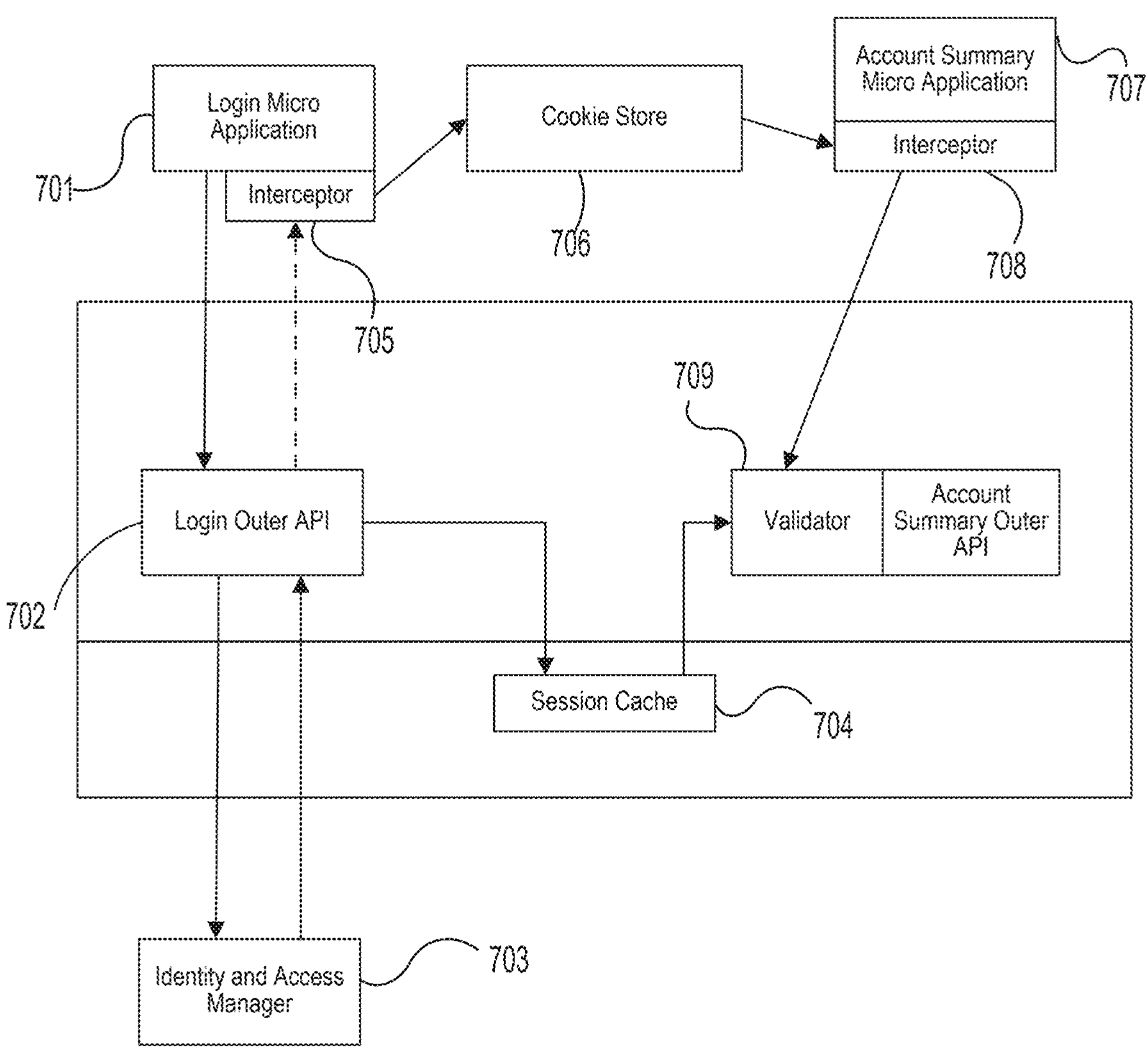
FIG. 7 is a schematic block diagram of a system capable of using tokens to securely introduce a request to various API systems, consistent with disclosed embodiments.

FIG. 7 is a schematic block diagram of a system capable of using tokens to securely introduce a request to various API systems, consistent with disclosed embodiments. A login micro application 701 may send a username and password to a login outer API 702. The login outer API 702 may authenticate the username and password with an identity and access manager 703. Once the username and password are authenticated, the login outer API 702 receives a JWT generated by the identity and access manager 703. In some embodiments, the identity and access manager 703 may regenerate a JWT based on a set schedule or according to certain rules, for example, based on the passage of time, or the occurrence of an event. In some embodiments, when the identity and access manager 703 generates a new JWT, it may send the new JWT to the login outer API 702, which may then send the new JWT to the login micro application 701. In some embodiments, this scheduled regeneration may similarly occur for types of requests other than login requests, such as account summary requests.

The login outer API 702 may then generate a CSRF token and session ID via a validator or other component of the pod. The login outer API 702, via the validator, may store the JWT and CSRF token keyed with the session ID in the session cache 704, such as a Redis cache.

The login outer API 702 may respond to the login micro application 701, sending the session ID, JWT, and CSRF token to the login micro application 701. An interceptor 705 may intercept the response and extract the session ID, JWT, and CSRF token and store them in a session cookie, if not already done so by the login outer API 702. The interceptor 705 may store the session cookie in a cookie store 706. The interceptor 705 may refer to a component that sits between the login outer API 702 and the login micro application 701 and may intercept a response from the login outer API 702 before passing the response to the login micro application 701. The interceptor 705 may perform functions such as pre-processing the response, including extracting tokens and saving them. The login micro application 701 may then receive the response.

The browser may then generate a request to access an account via an account summary micro application 707. An interceptor 708 may intercept the request. The interceptor 708 may retrieve the session cookie, which may include the session ID, JWT, and CSRF token from the cookie store 706 and inject the session cookie into the request header. In some embodiments, the interceptor 708 may be part of a framework. The framework may be a framework or toolkit designed to facilitate the development and management of requests and responses, including the use of interceptors for request and server responses.

A validator 709 may intercept the request and extract the session ID from the session cookie from the request header.

The validator 709 may then use the session ID to pull at least one session object from the session cache 704. The at least one session object may contain the JWT and CSRF token. The validator 709 may then validate the incoming JWT and CSRF token by comparing them to the JWT and CSRF token from the at least one session object in the session cache 704. Validating the JWT may include verifying that the JWT is properly signed, using a public key, and/or verifying that the JWT is not expired.

A public key for JWT may be a cryptographic key used to verify the authenticity of the token's signature, ensuring that the JWT was issued by a trusted source. The public key may work in conjunction with a private key, allowing anyone with the public key to validate the token without needing access to the private key that was used to sign it. A private key for JWT may be a cryptographic key used to sign the token, creating a unique signature that ensures the token's integrity and authenticity. The private key may be kept secure and confidential by the issuer, as it may be designed so that it is the only key that can generate a signature that can be verified by the corresponding public key.

If validation of the JWT and CSRF token is successful, the request may be allowed. If validation is not successful, the request may be rejected, and the user may be prompted to reenter their credentials. If the request is allowed, a response may be sent to the account micro application 707.

In other embodiments, one or a combination of CSRF and/or MORF tokens may be used instead of or in addition to JWT. The process for validating MORF tokens is explained in the detailed description of FIG. 17.

In some embodiments, a new JWT, CSRF, and/or MORF token may be generated by the outer API, a validator, or the identity and access manager with every response. In such embodiments, validation of the token may require the subsequent request to contain the new token.

Figure 8:
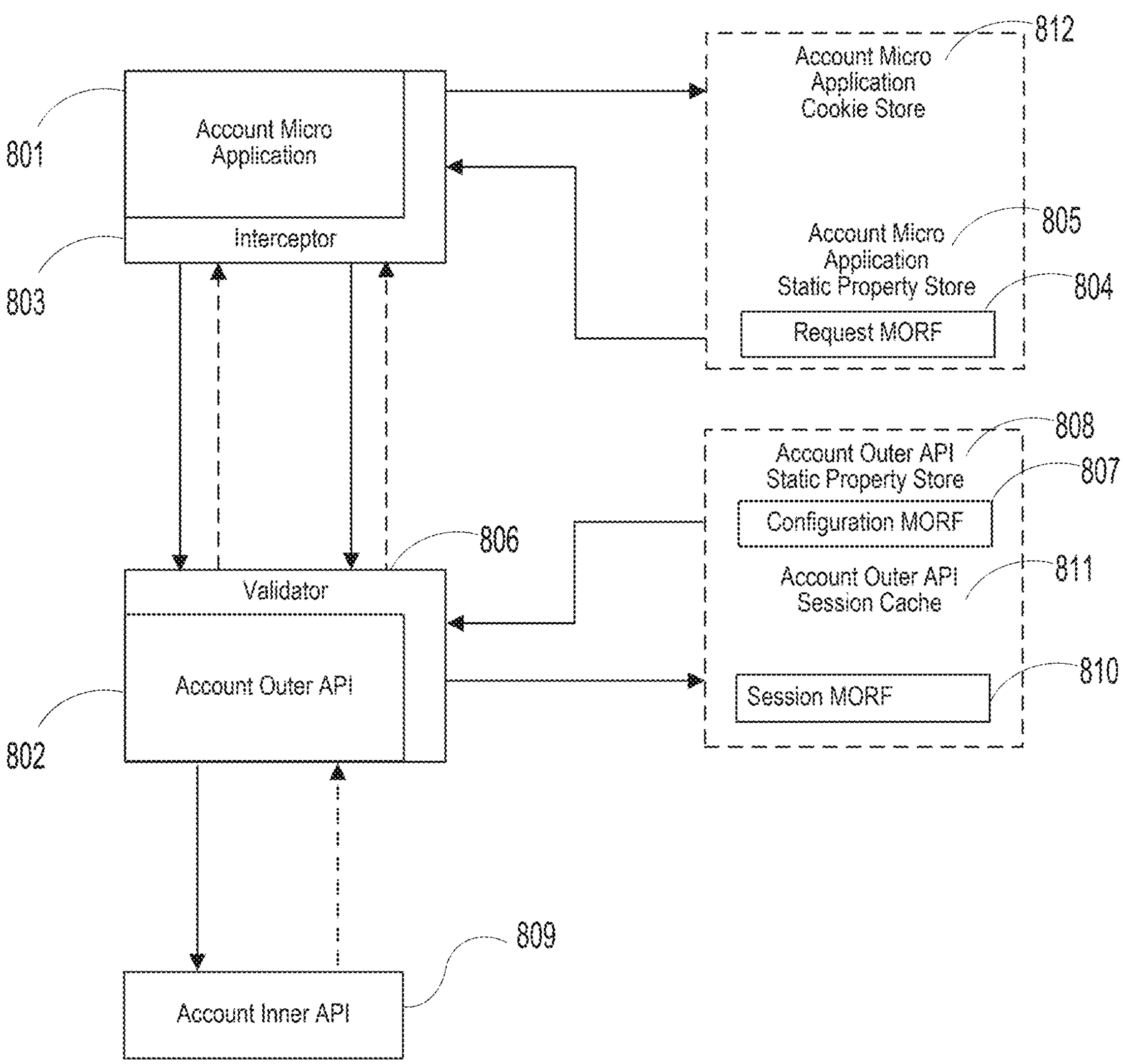
FIG. 8 is a schematic block diagram of a system capable of using MORF tokens to securely introduce a request to various API systems, consistent with disclosed embodiments.

FIG. 8 is a schematic block diagram of a system capable of using MORF tokens to securely introduce a request to various API systems, consistent with disclosed embodiments. In operation, an account micro application 801 may call an account outer API 802 to retrieve data from the account outer API. An interceptor 803 may intercept the call and place a request MORF token 804 from a micro application static property store 805 into the request header. The micro application static property store 805 may be a mechanism for storing information that does not change frequently during the user's session.

The interceptor 803 may send to the request with the embedded request MORF token to the account outer API 802. A validator 806 may intercept the request and validate the request MORF token 804 by comparing it to a configuration MORF token 807 in the account outer API static properties store 808. Once the request MORF token 804 is validated, the request may be converted to a validated request or a validated request object.

If valid, the validator 806 may create a validated request object and transmit the validated request object to an account inner API 809 to complete the request with the assistance of a SOR. Then, the completed request, referred to as a response, may be released to the account outer API 802. The response may include a response header.

Once the account outer API 802 has received the response from the account inner API 809, the validator 806 may intercept the response and generate a new session MORF token 810, which the validator 806 may store in an account outer API session cache 811. The validator 806 may then add the new session MORF token 810 to a response header.

The completed response with the new session MORF token 810 in the response header may be sent back to the account micro application 801. The interceptor 803 may intercept the response and extract the new session MORF token 810 from the response header and store it in an account micro application cookie store 812. The first request from the account micro application may be complete.

The account micro application 801 may send a second request to the account outer API 802. The interceptor 803 may intercept the second request and place the new Session MORF token 810 in the request header as a request MORF token 804. The validator 806 may intercept the incoming request to the account outer API 802 and compare the request MORF token 804 with the session MORF token 810 saved in the outer API session cache 811. If valid, the validator 806 may release the request to the account outer API 802 to be fulfilled by the account inner API 809. The validator 806 may then generate a new session MORF token 810 for each subsequent response.

One embodiment of the system shown in of FIG. 8 may be different from that of FIG. 7 because the embodiment of FIG. 8 uses MORF tokens that may be renewed for every request. In contrast, the embodiment in FIG. 7 may use tokens that may be reused for multiple requests during the user's session. However, it should be understood that the process described in FIG. 7 may similarly require the tokens to be renewed for every request for increased security.

In one embodiment, JWT and CSRF tokens may also be used. In another embodiment, the Inner API and the SOR may validate the JWT with every request.

Figure 9:
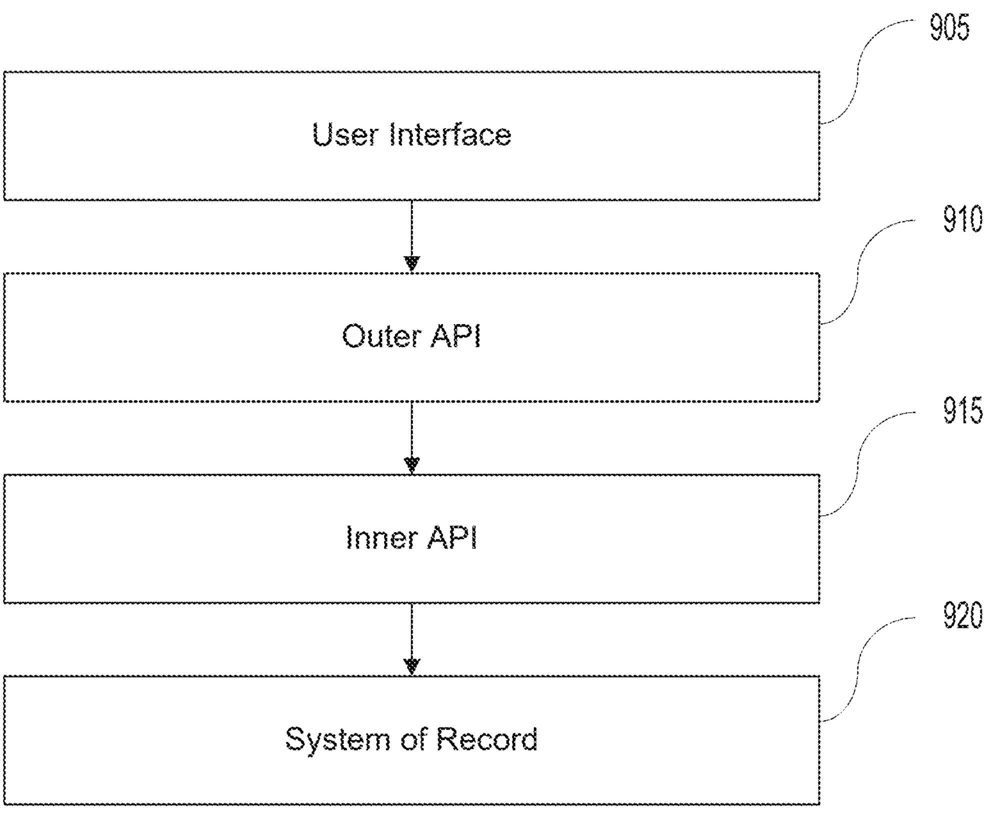
FIG. 9 is a diagram showing a vertical slice, consistent with disclosed embodiments.

FIG. 9 is a diagram showing a vertical slice, consistent with disclosed embodiments. In operation, a user may enter an account-related request via user interface 905. An outer API 910 may receive the request from the user interface 905 and orchestrate a call to an inner API 915. Inner API 915 may act as an abstraction layer between the user interface 905 and a system of record 920. The system of record 920 may also be referred to as the back end. Outer API 910 may filter and transform data retrieved from the back end in preparation for consumption by user interface 905, as described above.

Figure 10:
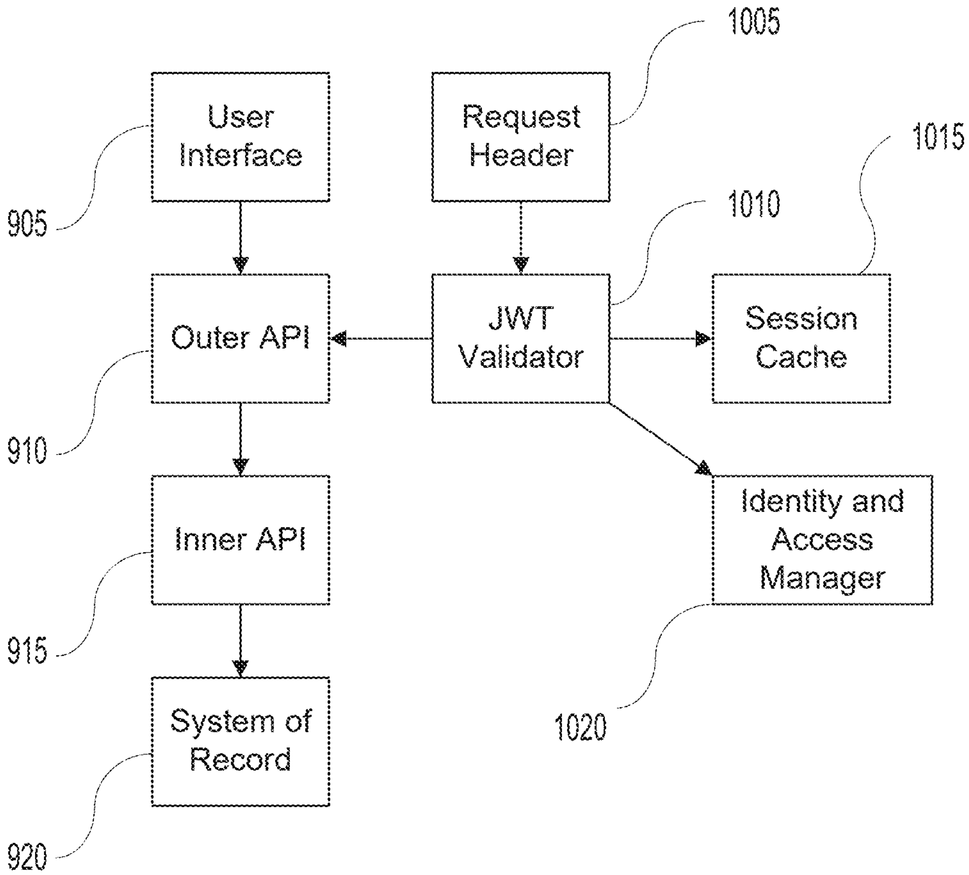
FIG. 10 is a schematic block diagram of a system capable of validating JWTs, consistent with disclosed embodiments.

FIG. 10 is a schematic block diagram of a system capable of validating JWTs, consistent with disclosed embodiments. FIG. 10 incorporates elements from FIG. 9. An outer API 910 may receive the request from the user interface. Inner API 915 may act as an abstraction layer between the user interface 905 and a system of record 920. The system of record 920 may also be referred to as the back end. Outer API 910 may filter and transform data retrieved from the back end in preparation for consumption by user interface 905, as described above.

In operation, a user may enter an account-related request via user interface 905. Then, the JWT validator 1010 may call on the identity and access manager 1020 to generate a JWT and sign the JWT using the server's private key. The identity and access manager 1020 may regenerate JWTs based on a set schedule or according to certain rules, for example, based on the passage of time, or the occurrence of an event. The private key may be securely stored in the server so the private key can be used to sign other JWTs.

The JWT validator 1010 may then send the signed JWT along with a public key to the outer API 910, which may then send the signed JWT along with the public key to the client. A public key may be a key that is distributed with the signed JWT and is accessible to the public. The client, the server, or third parties' servers may use the public kay to verify whether the JWT is authentic.

The client may then save the signed JWT in a session cookie. When the browser submits a request, it provides the JWT in a request header 1005. The request may be received by a JWT validator 1010. The JWT validator 1010 may extract the JWT and public kay from the request header 1005 and determine whether a public key is current by checking the expiration field of the public key.

If the public key is not current, the most current public key may be retrieved from the identity and access manager 1020 via a trusted source, such as a JSON web key set endpoint provided by the token issuer. After obtaining the most current public key, the identity and access manager 1020 may store it in the session cache 1015.

If the public key is determined to be current, the JWT may be validated. To validate the JWT, the JWT validator 1010 may use the public key to ensure the JWT has an authentic signature. After validation, the JWT may be stored in a session cache 1015 and the request may be routed to the outer API 910, which may then route the request to the inner API 915. The inner API 915 may then route the request to the system of record 920, for the request to be performed. In some embodiments, a new JWT may be generated, signed, and sent to the client with every response. In some embodiments, JWT validation may also occur at one or more of the outer API 910, inner API 915, and/or the system of record 920.

Figure 11:
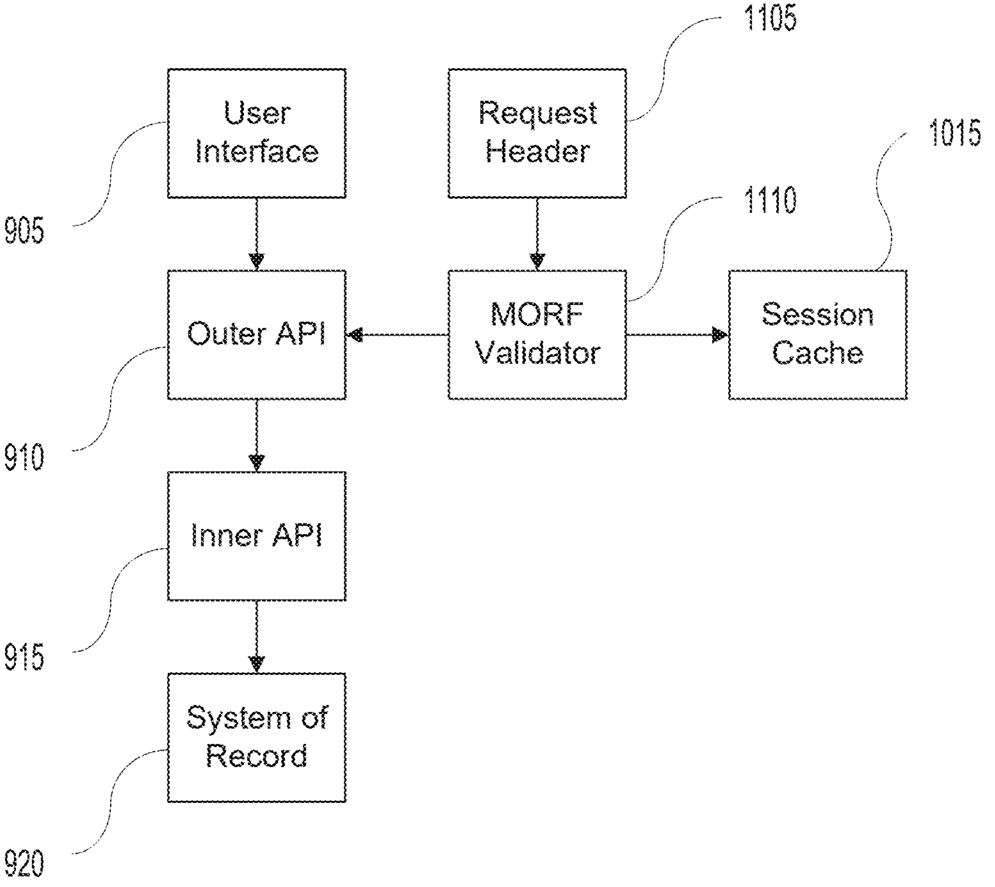
FIG. 11 is a schematic block diagram of a system capable of validating MORF tokens, consistent with disclosed embodiments.

FIG. 11 is a schematic block diagram of a system capable of validating MORF tokens, consistent with disclosed embodiments. FIG. 11 incorporates elements from FIGS. 9 and 10. In operation, a user may enter an account-related request via user interface 905. An outer API 910 may receive the request from the user interface and orchestrate a call to an inner API 915. Inner API 915 may act as an abstraction layer between the user interface 905 and a system of record 920. The system of record 920 may also be referred to as the back end.

In operation, a user may enter an account-related request via a user interface 905. An outer API 910 may receive the request from the User Interface 905. The MORF validator 1110 may generate a MORF token and save a copy of the token in at least one session object. A session object may be saved in session cache 1015 on the server-side. The types of user-specific information saved by a session object may include authentication tokens, authentication status, preferences, or temporary information. The MORF validator 1110 may then send the MORF token to the outer API 910, which may then send the MORF token to the client.

The client may then save the MORF token in a session cookie. When the browser submits a request, it may provide the MORF token in a request header 1105. The MORF token may be received by the MORF validator 1110. The MORF validator 1110 may pull the MORF token saved in the session cache 1015. Then, the MORF validator 1110 may validate the MORF token by confirming that a MORF token extracted from the session cache 1015 matches the MORF token contained in request header 1105. MORF tokens may be a string of characters, and the MORF tokens must exactly match to be validated. If validated, the MORF token from the request header 1105 may be stored in the session cache 1015.

If the request is validated, the MORF validator 1110 may convert the request object to a validated request object and transmit the validated request object to the outer API 910, which may then route the request to the inner API 915. The inner API 915 may then route the request to the system of record 920, for the request to be processed. In some embodiments, this logic of generating and validating new MORF tokens may occur for every subsequent request.

Figure 12:
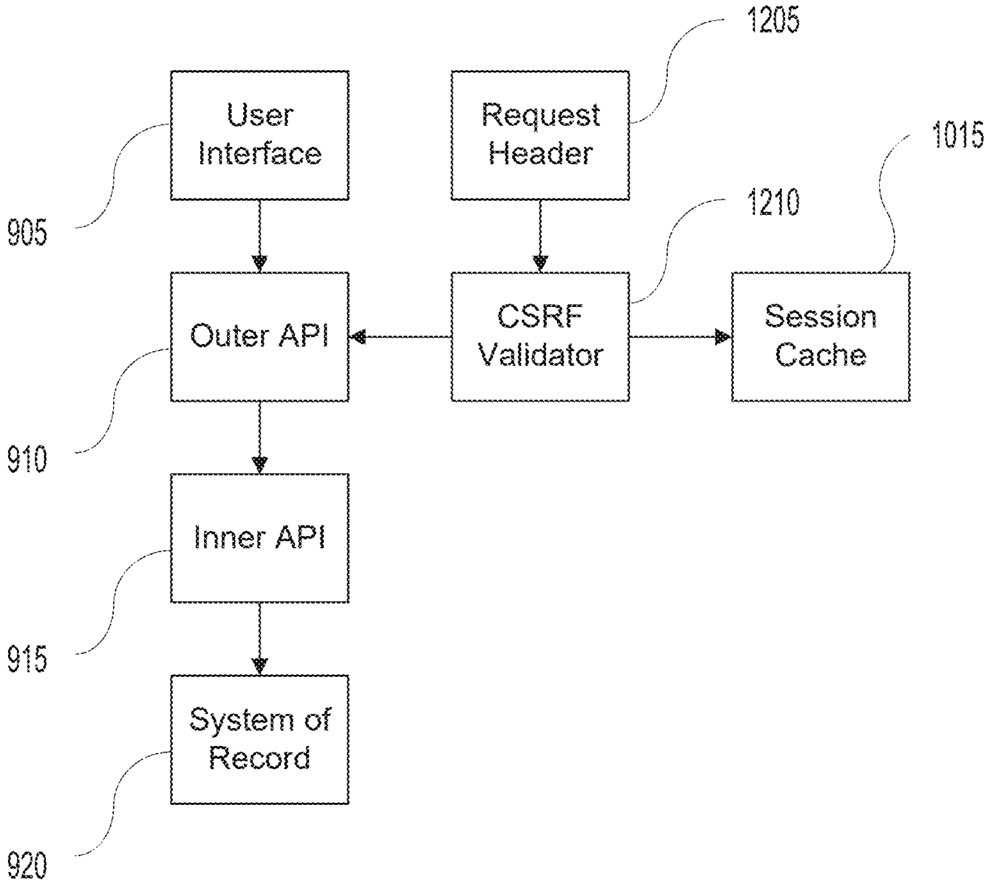
FIG. 12 is a schematic block diagram of a system capable of validating CSRF tokens, consistent with disclosed embodiments.

FIG. 12 is a schematic block diagram of a system capable of validating CSRF tokens, consistent with disclosed embodiments. FIG. 12 incorporates elements from FIGS. 9 and 10. In operation, a user may enter an account-related request via user interface 905. An outer API 910 may receive the request from the user interface and orchestrate a call to an inner API 915. Inner API 915 may act as an abstraction layer between the user interface 905 and a system of record 920. The system of record 920 may also be referred to as the back end. Outer API 910 may filter and transform data retrieved from the back end in preparation for consumption by user interface 905.

In operation, a user may enter an account-related request via a user interface 905. An outer API 910 may receive the request from the user interface 905. The CSRF validator 1210 may generate a CSRF token and save a copy of the token in at least one session object. A session object may be saved in session cache 1015 on the server-side. The types of user-specific information saved by a session object may include authentication tokens. The CSRF validator 1210 may then send the CSRF token to the outer API 910, which may then send the CSRF token to the client.

The client may then save the CSRF token in a session cookie. When the browser submits a request, it may provide the CSRF token in a request header 1205. The CSRF token may be received by the CSRF validator 1210. The CSRF validator 1210 may pull the CSRF token saved in the session cache 1015. Then, the CSRF validator 1210 may validate the CSRF token by confirming that a CSRF token extracted from the session cache 1015 matches the CSRF token contained in request header 1105. CSRF tokens may be a string of characters, and the CSRF tokens must exactly match to be validated. If validated, the CSRF token from the request header 1105 may be stored in the session cache 1015.

If validated, the CSRF validator 1210 may convert the request object to a validated request object and transmit the validated request object to the outer API 910, which may then route the request to the inner API 915. The inner API 915 may then route the request to the system of record 920, for the request to be processed. In some embodiments, this logic of generating and validating new CSRF tokens may occur for every subsequent request.

Figure 13:
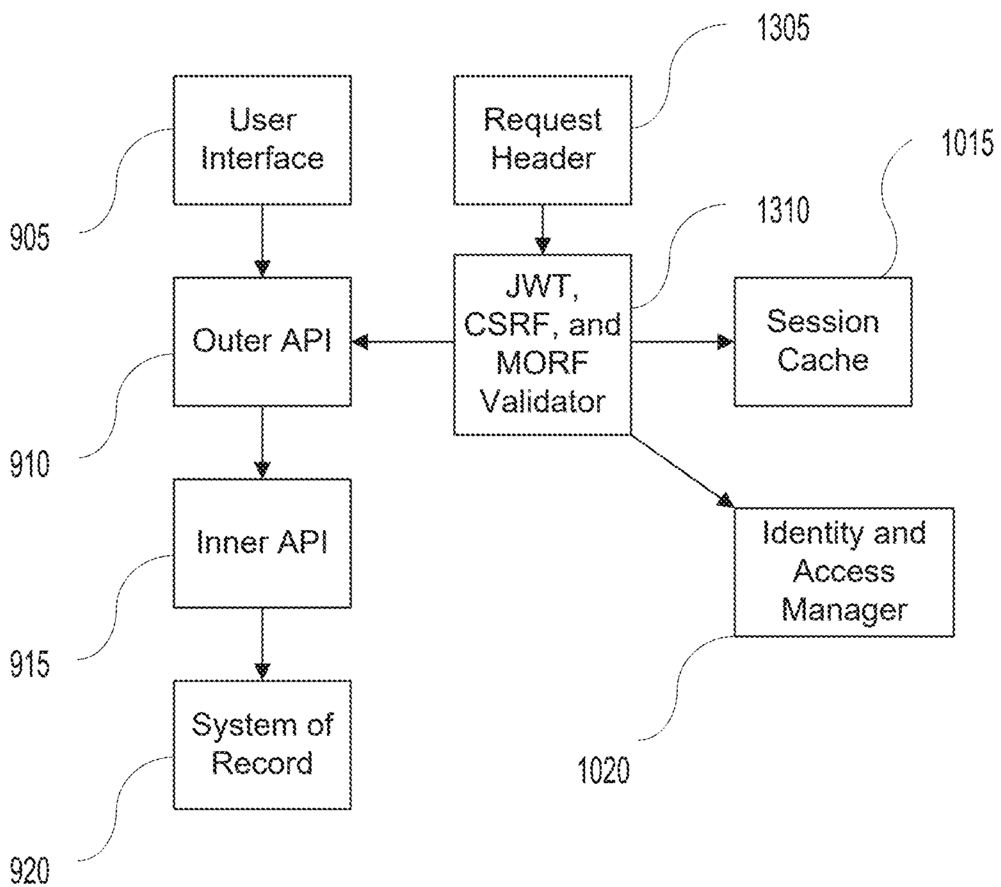
FIG. 13 is a schematic block diagram of a system capable of validating JWTs, MORF tokens, and CSRF tokens, consistent with disclosed embodiments.

FIG. 13 is a schematic block diagram of a system capable of validating JWTs, MORF tokens, and CSRF tokens, consistent with disclosed embodiments. FIG. 13 incorporates elements from FIGS. 9 and 10. In operation, a user may enter an account-related request via user interface 905. An outer API 910 may receive the request from the user interface and orchestrate a call to an inner API 915. Inner API 915 may act as an abstraction layer between the user interface 905 and a system of record 920. The system of record 920 may also be referred to as the back end. Outer API 910 may filter and transform data retrieved from the back end in preparation for consumption by user interface 905.

In operation, a user may enter an account-related request via a user interface 905. An outer API 910 may receive the request from the user interface 905. The JWT, CSRF, and MORF validator 1310 may generate a CSRF token and a MORF token and save a copy of the token in at least one session object. A session object may be saved in session cache 1015 on the server-side. A token saved in a session cache may be referred to as a cached token. For example, a JWT, a MORF token, or a CSRF token, saved in the session cache may be referred to as a cached JWT, a cached MORF token, or a cached CSRF token, respectively. The types of user-specific information saved by a session object may include authentication tokens, authentication status, preferences, or temporary information.

Then, the JWT, CSRF, and MORF validator 1310 may call on the identity and access manager 1020 to generate a JWT and sign the JWT using the server's private key. The identity and access manager 1020 may regenerate JWTs based on a set schedule or according to certain rules, for example, based on the passage of time, or the occurrence of an event. The private key may be securely stored in the server so the private key can be used to sign other JWTs.

The JWT, CSRF, and MORF validator 1310 may then send the CSRF token, the MORF token, the signed JWT, and a public key to the outer API 910, which may then be forwarded to the client by the outer API. A public key may be a key that is distributed with the signed JWT and is accessible to the public. The client, the server, or third parties'servers may use the public key to verify whether the JWT is authentic.

The client may then save the CSRF token, the MORF token, the signed JWT, and a PublicKey in one or more session cookies. A token saved in a session cookie may be referred to as a cookie token. For example, a JWT, a MORF token, or a CSRF token, saved in a session cookie may be referred to as a cookie JWT, a cookie MORF token, or a cookie CSRF token, respectively. When the browser submits a request, it may provide the CSRF token, the MORF token, the signed JWT, and a public key in a request header 1305. The CSRF token, the MORF token, the signed JWT, and a public key may be received by the JWT, CSRF, and MORF validator 1310.

The JWT, CSRF, and MORF validator 1310 may pull the MORF token saved in the session cache 1015. Then, the JWT, CSRF, and MORF validator 1310 may validate the MORF token by confirming that a MORF token extracted from the session cache 1015 matches the MORF token contained in request header 1305. MORF tokens may be a string of characters, and the MORF tokens must exactly match to be validated. If validated, the MORF token from the request header 1105 may be stored in the session cache 1015.

Then, the JWT, CSRF, and MORF validator 1310 may validate the CSRF token by confirming that a CSRF token extracted from the session cache 1015 matches the CSRF token contained in request header 1305. CSRF tokens may be a string of characters, and the CSRF tokens must exactly match to be validated. If validated, the CARF token from the request header 1305 may be stored in the session cache 1015.

Then, the JWT, CSRF, and MORF validator 1310 may determine whether a public key is current by checking the expiration field of the public key. If the public key is not current, the most current public key may be retrieved from the identity and access manager 1020 via a trusted source, such as a JSON web key set endpoint provided by the token issuer. After obtaining the most current public key, the identity and access manager 1020 may store it in the session cache. If the public key is determined to be current, the JWT may be validated. To validate the JWT, the JWT, CSRF, and MORF validator 1310 may use the public key to ensure the JWT has an authentic signature. After validation, the JWT may be stored in a session cache 1015.

If the CSRF token, MORF token, and JWT are validated, the JWT, CSRF, and MORF validator 1310 may convert the request object to a validated request object and transmit the validated request object to the Outer API 910, the Inner API 915, and the System of Record 920, for processing. In some embodiments, this logic of generating and validating a new CSRF token and a new MORF token may occur for every subsequent request. In some embodiments, a new JWT may be generated, signed, and sent to the client with every response. In some embodiments, JWT validation may also occur at one or more of the outer API 910, inner API 915, and/or the system of record 920.

A token validator may encompass a JWT validator; a MORF validator; a CSRF validator; and a JWT, CSRF, and MORF validator.

Figure 14:
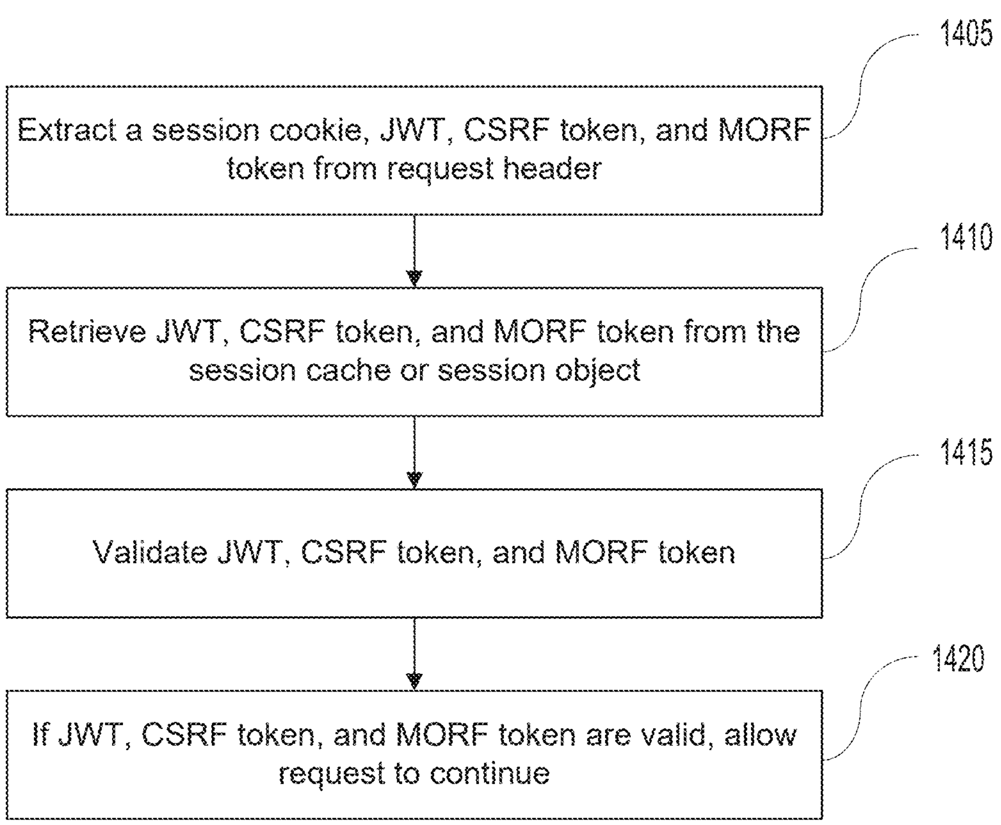
FIG. 14 is a flow diagram of a method of validating JWTs, MORF tokens, and CSRF tokens, consistent with disclosed embodiments.

FIG. 14 is a flow diagram of a method of validating JWTs, MORF tokens, and CSRF tokens, consistent with disclosed embodiments. At step 1405, a session cookie, a JWT, a CSRF token, and a MORF token may be extracted from a request header or a hidden form within the request. The session cookie may contain a session ID. At step 1410, the server may locate at least one session object and/or session cache based on the session ID extracted from the session cookie. The at least one session object and/or session cache may contain the CSRF and MORF tokens.

At step 1415, the JWT, CSRF token, and MORF token may be validated. The CSRF token and the MORF token may be validated by comparing the CSRF and MORF tokens received with the request to the CSRF and MORF tokens stored in the at least one session object in the session cache. The JWT may be validated by using the public key to ensure the JWT was properly signed. Once the JWT, CSRF, and MORF tokens are validated at step 1415, the request may be allowed to continue at step 1420. In some embodiments, after the request is allowed to continue, the JWT, the CSRF token, and the MORF token may be stored in session cache 1015. One benefit of storing the JWT, the CSRF token, and the MORF token in session cache 1015 may be the ability to invalidate/revoke or refresh the JWT, the CSRF token, and the MORF token, or for auditing, tracking, or logging purposes.

Figure 15:
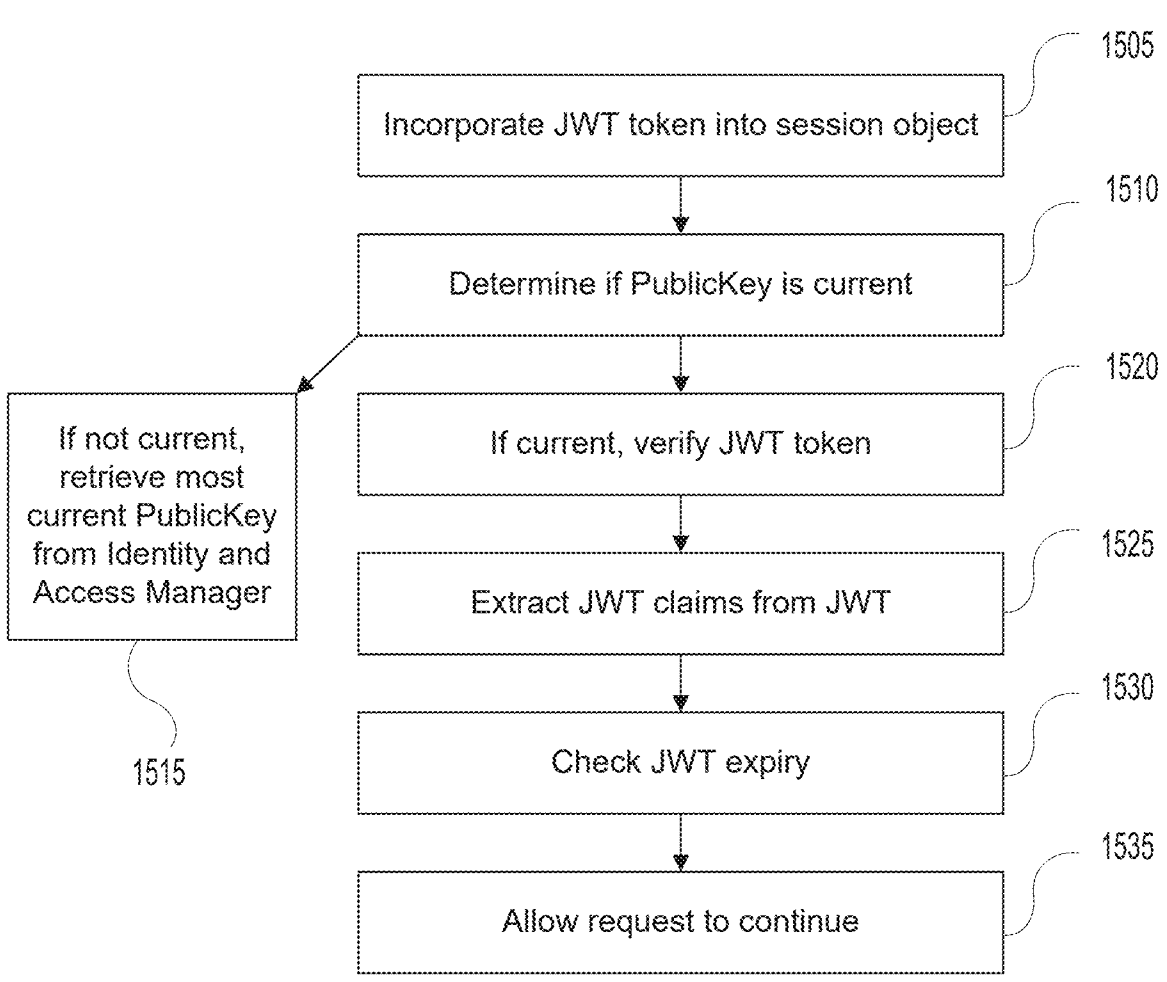
FIG. 15 is a flow diagram of a method of validating JWTs, consistent with disclosed embodiments.

FIG. 15 is a flow diagram of a method of validating JWTs, consistent with disclosed embodiments. At step 1505, after the pod receives a JWT from a client's request header, the JWT may be incorporated into a session object by saving the JWT in the session object. At step 1510, a determination may be made regarding whether a public key is current. If the public key is not current, at step 1515, the most current public key may be retrieved from the identity and access manager. If the public key is determined current, a JWT may be verified at step 1520. At step 1525, JWT claims may be extracted from a JWT payload.

The JWT claims may store information such as the token issuer, the subject, audience, expiration time, the validity time (sometimes called "not before"), the issuance time, and a unique token ID. Subject may represent the entity (user, service, or client) that the token is about. Audience may represent the intended recipients of the token. Validity time or not before time may specify the earliest time that the token is considered valid. The unique token ID may help prevent replay attacks The JWT claims may also store information about the user, such as the user's role, permissions, and profile. The user's role may refer to a role as admin, editor, or customer. The user's permissions may refer to the allowed actions the user can perform. The user's profile may refer to profile information such as name and email address.

The JWT claims may also store information that is specific to an application or service and use for internal purposes, for example, the JWT session ID.

Claims may provide the details that the server can use to understand and authorize the user or service making the request. Once the JWT claims are extracted at step 1525, a JWT expiry may be checked at step 1530. If the JWT is verified and not expired, at step 1535, the request may be allowed to continue. In some embodiments, new JWTs may be issued and verified for each response and request.

Figure 16:
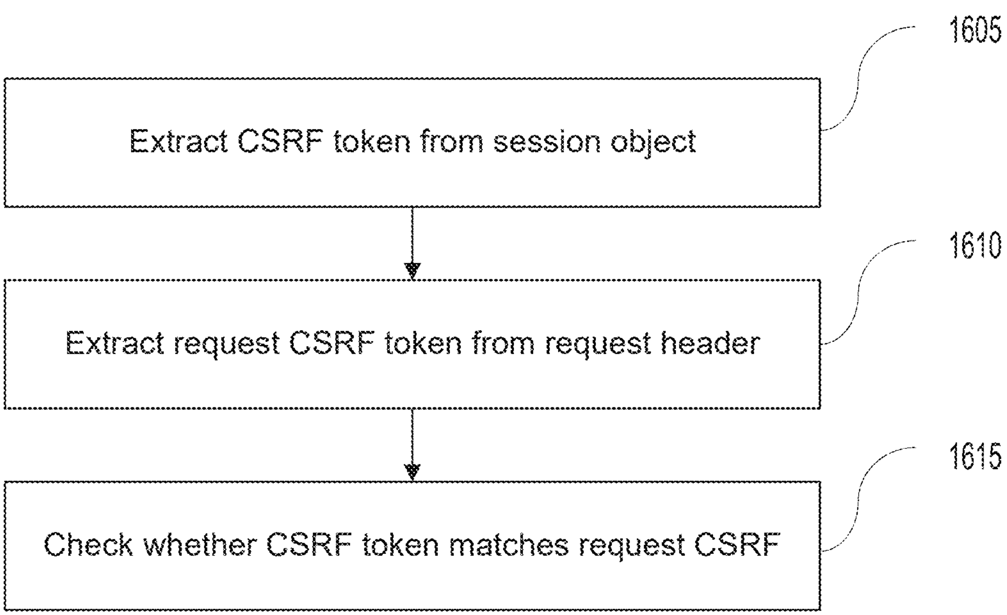
FIG. 16 is a flow diagram of a method of validating CSRF tokens, consistent with disclosed embodiments.

FIG. 16 is a flow diagram of a method of validating CSRF tokens, consistent with disclosed embodiments. At step 1605, a CSRF token may be extracted from a session object. At step 1610, a request CSRF token may be extracted from a request header. Once the request CSRF token is extracted from the request header at step 1610, at step 1615, the request CSRF token may be checked to confirm it matches the CSRF token extracted from the session object.

Figure 17:
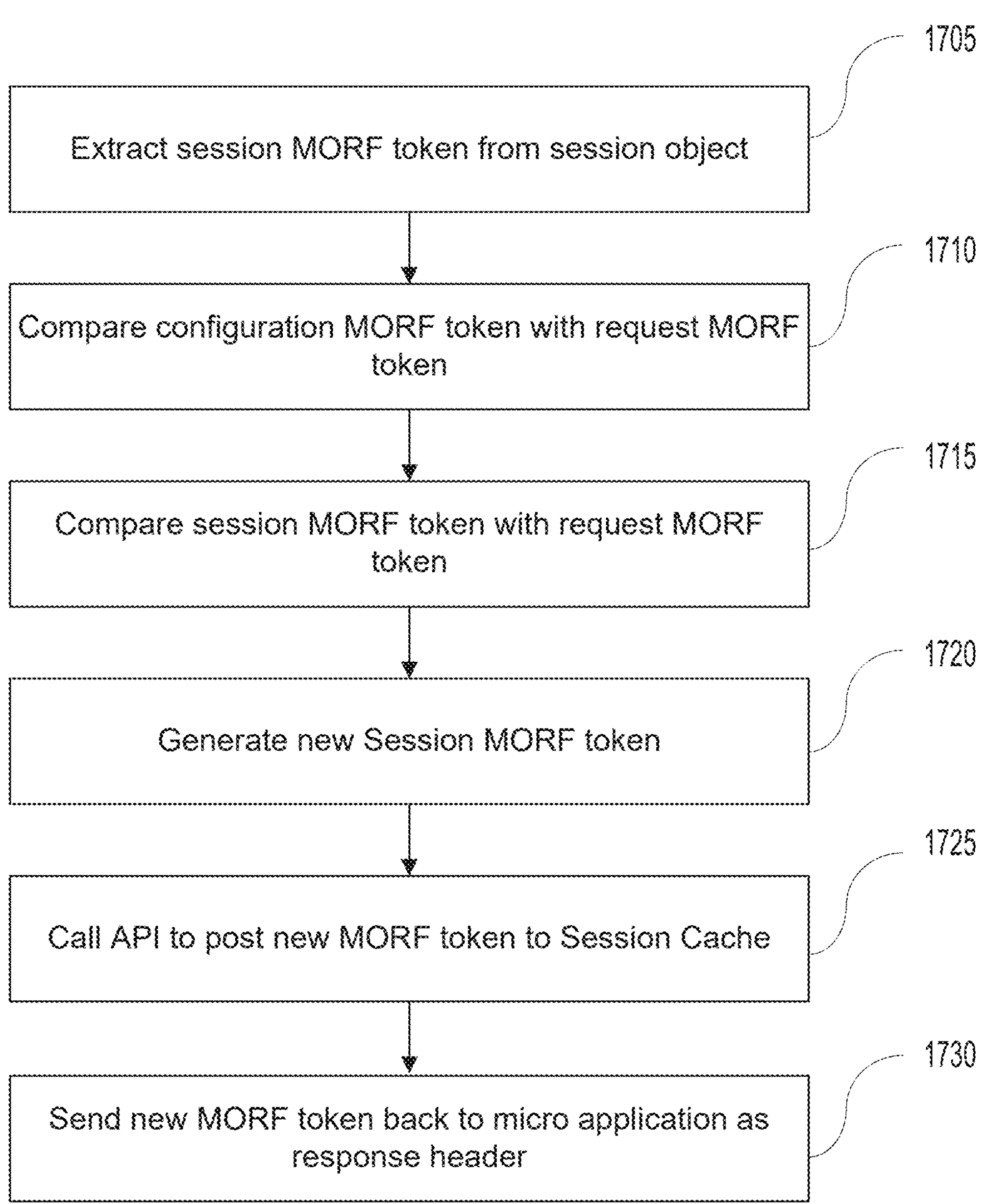
FIG. 17 is a flow diagram of a method of validating MORF tokens, consistent with disclosed embodiments.

FIG. 17 is a flow diagram of a method of validating MORF tokens, consistent with disclosed embodiments. At step 1705, a session MORF token may be extracted from a session object. Session MORF tokens may be associated with a user's session and can be used for multiple requests throughout the session's lifecycle. Session MORF tokens may help maintain state and security during user interactions with the application.

At step 1710, a configuration MORF token may be compared with a request MORF token.

Request MORF tokens may be tokens generated specifically for a single request. They ensure that the request being made is intentional and originated from the authenticated user. They are scoped to a specific action or request and are not reused across multiple interactions.

In some embodiments, the configuration MORF token may be extracted from a user interface, and the request MORF token may be extracted from a session cookie. Once the configuration MORF token is compared with the request MORF token at step 1710, at step 1715, the session MORF token may be compared with the request MORF token.

At step 1720, a new session MORF token may be generated and stored in a session cache. Once the new session MORF token is generated and stored at step 1720, an API may be called to post the new session MORF token to the session cache at step 1725. At step 1730, the new MORF token may be sent back to the micro application as a response header and may be used as a request MORF token for the next request.

In some embodiments, the process of generating and validating a new MORF token is repeated for each response and request as a measure to mitigate replay attacks.

In some embodiments multiple session cookies may be utilized. For example, one or more tokens may be saved in one session cookie. In some embodiments multiple session objects may be utilized. For example, one or more tokens may be saved in one session object.

Although the disclosure has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed:

1. A system for securely receiving a request comprising:

a memory storing instructions; and a processor configured to execute instructions to perform operations to:

receive an application request from a micro application, the micro application configured to:

receive a client request from a client, the client request including a request header that includes a session cookie, the session cookie including a session identifier ("ID") and a cookie token selected from one or more of a JavaScript Object Notation ("JSON") web request token, a cross site request forgery request ("CSRF") token, or a micro application outer request forgery ("MORF") token;

transform the client request into the application request; and transmit the application request to the processor;

transmit the application request to a reverse proxy, the reverse proxy configured to:

receive the application request from the processor; and transmit the application request to a pod based on a set of predefined rules, wherein the pod includes a validator and the predefined rules include maximum traffic volume to the pod, availability of the pod, and required response time of the pod, such that the pod is one that has not reached its maximum traffic, is available, and has an adequate response time, the validator configured to:

receive the application request from the reverse proxy;

extract the session cookie from the request header;

extract the cookie token from the session cookie;

locate a session object stored in a session cache, based on the session ID;

extract a cached token from the session object, wherein the cached token is a same type of token as the cookie token;

compare the cookie token with the cached token;

convert the application request into a validated request upon determining the cookie token matches the cached token; and transmit the validated request to a vertical slice for processing, wherein the vertical slice includes at least one of an outer application program interface ("API"), an inner API, or a system of record.

2. The system of claim 1, wherein the processor is further configured to transmit the application request to one or more of a distributed denial of service mitigator, an external firewall, and an internal firewall;

the distributed denial of service mitigator configured to screen the application request for a distributed denial of service attack and transmit the application request to the processor;

the external firewall configured to screen the application request based on a first set of predefined security rules and transmit the application request to the processor; and the internal firewall configured to screen the application request based on a second set of predefined security rules and transmit the application request to the processor.

3. The system of claim 1, wherein the session cache is saved on a random access memory.

4. The system of claim 1, wherein the reverse proxy is further configured to:

extract the session cookie from the request header;

extract the cookie token from the session cookie;

locate a session object stored in a session cache, based on the session ID;

extract a second cached token from the session object, wherein the second cached token is a same type of token as the cookie token; and compare the cookie token with the second cached token.

5. The system of claim 1, wherein the reverse proxy is further configured to distribute client requests across multiple servers based on a request type.

6. The system of claim 1, wherein the reverse proxy is further configured to route the client request to a URL reviser.

7. The system of claim 6, wherein the URL reviser is configured to revise a URL associated with the client request for readability.

8. The system of claim 1, the system further configured to enforce security policies of the system.

9. The system of claim 1, wherein the inner API is accessible only from within the system.

10. The system of claim 1, wherein the outer API is a bridge between the system and a third-party.

11. The system of claim 1, wherein the outer API is configured to perform at least one of: orchestrating calls to the inner API, transforming data, filtering data, or preparing data for consumption by a user interface.

12. The system of claim 1, wherein the outer API is configured to enforce a set of rules to prevent unauthorized users from accessing the system.

13. The system of claim 1, wherein the validator is further configured to determine the cookie token is not expired.

14. The system of claim 1, wherein the vertical slice includes a one to one ratio of outer APIs to inner APIs.

15. The system of claim 1, wherein the pod is automatically scaled.

16. The system of claim 1, wherein the MORF token ensures that the client request is sent to the correct vertical slice.

17. The system of claim 1, wherein the MORF token is configured to prevent unauthorized access between the micro application and the outer API.

18. A method for securely receiving a request, the method comprising:

receiving an application request from a micro application, the micro application configured to:

receive a client request from a client, the client request including a request header that includes a session cookie, the session cookie including a session identifier ("ID") and a cookie token selected from one or more of a JavaScript Object Notation ("JSON") web request token, a cross site request forgery request ("CSRF") token, or a micro application outer request forgery ("MORF") token;

transform the client request into the application request; and transmit the application request to the processor;

transmitting the application request to a reverse proxy, the reverse proxy configured to:

receive the application request from the processor; and transmit the application request to a pod based on a set of predefined rules, wherein the pod includes a validator and the predefined rules include maximum traffic volume to the pod, availability of the pod, and required response time of the pod, such that the pod is one that has not reached its maximum traffic, is available, and has an adequate response time, the validator configured to:

receive the application request from the reverse proxy;

extract the session cookie from the request header;

extract the cookie token from the session cookie;

locate a session object stored in a session cache, based on the session ID;

extract a cached token from the session object, wherein the cached token is a same type of token as the cookie token;

compare the cookie token with the cached token;

convert the application request into a validated request upon determining the cookie token matches the cached token; and transmit the validated request to a vertical slice for processing, wherein the vertical slice includes at least one of an outer application program interface ("API"), an inner API, or a system of record.

19. The method of claim 18, wherein the outer API is a bridge between the system and a third-party.

20. The method of claim 18, wherein the outer API is configured to perform at least one of: orchestrating calls to the inner API, transforming data, filtering data, or preparing data for consumption by a user interface.

* * * * *